(12) United States Patent
Harvey

(10) Patent No.: US 10,805,269 B2
(45) Date of Patent: Oct. 13, 2020

(54) WEB APPLICATION FIREWALL

(71) Applicant: ROYAL BANK OF CANADA, Montreal (CA)

(72) Inventor: Stéphane Harvey, Toronto (CA)

(73) Assignee: ROYAL BANK OF CANADA, Montreal (CA)

( * ) Notice: Subject to any disclaimer, the term of this patent is extended or adjusted under 35 U.S.C. 154(b) by 294 days.

(21) Appl. No.: 15/897,670

(22) Filed: Feb. 15, 2018

(65) Prior Publication Data
US 2018/0241721 A1 Aug. 23, 2018

Related U.S. Application Data

(60) Provisional application No. 62/460,294, filed on Feb. 17, 2017.

(51) Int. Cl.
*H04L 29/06* (2006.01)

(52) U.S. Cl.
CPC ...... *H04L 63/0254* (2013.01); *H04L 63/0227* (2013.01); *H04L 63/1425* (2013.01); *H04L 63/1441* (2013.01)

(58) Field of Classification Search
CPC ..... H04L 63/02; H04L 63/0227; H04L 63/14; H04L 63/1408; H04L 63/1425; H04L 63/1441
See application file for complete search history.

(56) References Cited

U.S. PATENT DOCUMENTS

| | | | |
|---|---|---|---|
| 8,402,529 B1 | 3/2013 | Green et al. | |
| 8,924,505 B2* | 12/2014 | Molland | H04L 67/02 709/217 |
| 8,996,715 B2* | 3/2015 | Roy | H04L 63/0245 709/230 |
| 9,098,702 B2 | 8/2015 | Rubin et al. | |
| 2007/0265954 A1* | 11/2007 | Mather | G06F 3/0481 705/37 |
| 2008/0307385 A1* | 12/2008 | Dreiling | G06F 8/34 717/108 |
| 2009/0328187 A1* | 12/2009 | Meisel | H04L 63/0218 726/13 |
| 2010/0332837 A1* | 12/2010 | Osterwalder | H04L 63/0245 713/172 |
| 2011/0099482 A1* | 4/2011 | Koved | G06F 21/604 715/741 |

(Continued)

OTHER PUBLICATIONS

WIPO, International Search Report and Written Opinion for International Application No. PCT/CA2018/050173 dated May 11, 2018.

*Primary Examiner* — Khang Do
(74) *Attorney, Agent, or Firm* — Norton Rose Fulbright Canada LLP; Maya Medeiros

(57) ABSTRACT

Embodiments described herein provide an application programming interface and framework for a web application firewall single policy model. The framework can layer on top of a firewall platform that provides web application specific widgets that may be toggled and configured to enable or disable certain firewall actions on a per application basis. The framework includes a security stack that defines the order for the widgets. The security stack can provide the ability for a single policy model to be used for the firewall and allows for per application customizations.

25 Claims, 24 Drawing Sheets

(56) References Cited

U.S. PATENT DOCUMENTS

| | | | | |
|---|---|---|---|---|
| 2011/0283359 A1* | 11/2011 | Prince | .................... | H04L 51/22 |
| | | | | 726/23 |
| 2014/0310392 A1* | 10/2014 | Ho | ......................... | H04L 67/02 |
| | | | | 709/223 |
| 2015/0143502 A1* | 5/2015 | Peterson | ............. | H04L 63/0245 |
| | | | | 726/11 |
| 2016/0219069 A1* | 7/2016 | Mittig | ................. | H04L 63/1416 |
| 2017/0063793 A1* | 3/2017 | Galbreath | ........... | H04L 63/0263 |
| 2017/0244737 A1* | 8/2017 | Kuperman | .......... | H04L 63/1425 |
| 2017/0251016 A1* | 8/2017 | Niv | ......................... | H04L 43/08 |
| 2018/0167406 A1* | 6/2018 | Zhong | .................... | G06F 11/30 |
| 2018/0351913 A1* | 12/2018 | Yanagida | ................ | G06F 13/00 |
| 2019/0222607 A1* | 7/2019 | Thatha | ................... | H04L 63/168 |

\* cited by examiner

WEB APPLICATION FIREWALL

FIELD

Embodiments described herein generally relate to the field of firewalls and network security.

INTRODUCTION

Large enterprises use web firewalls to filter inbound and outbound network traffic to monitor for activity including malicious activity. Web firewalls can be implemented using a combination of hardware and software. An example enterprise that uses firewalls is a financial institution. The financial institution may operate many web services or applications that may each have a need for their own specific firewall policy. A single firewall policy might not be applicable to all web applications hosted by a financial institution. For example, one web application may need its traffic restricted in a particular manner according to a particular set of rules, while another web application may not function at all under the rules from the first application. The result is typically a watered-down policy for all that does not offer much protection, and no customization.

A developer might have to program their own firewall policy rules for each web application in a programming environment that runs on a particular vendor's firewall platform. However, this approach is time consuming and difficult as it requires a skilled programmer to modify code every time a change is needed.

SUMMARY

In an aspect, embodiments described herein provide a firewall system with a processor executing code to configure widgets for web applications and a security stack that provides an order of execution for the widgets and an activation configuration to toggle each widget to enable or disable security actions on a per web application basis. The widgets being security widgets and state control widgets, the security widgets having code to implement behaviour analysis detection and signature detection for a request received from an application, the state control widgets having code to implement decision making for network traffic.

In some embodiments, the state control widgets have an initialization state control widget that provides a placeholder for security state logic to be executed as soon as the request is received and prior to any security detection by the security widgets.

In some embodiments, the state control widgets have a post-inbound state control widget that provides a placeholder for security state logic to be executed after the request has been inspected for possible attack violation and before it is either sent to the web application or rejected all together.

In some embodiments, the state control widgets have a post-outbound state control widget provides a placeholder for security state logic to be executed after the response has been inspected for possible attack violation and before virtual patching.

In some embodiments, a widget is a code segment that implements WAF event listeners to provide particular firewall control functionality and interact with incoming or outgoing network traffic from the web applications.

In some embodiments, a widget that is disabled for a particular web application is bypassed by network traffic for the particular web application.

In some embodiments, the widgets includes a zero-tolerance widget such that any triggering of the zero-tolerance widget results in the widget performing a prescribed action.

In some embodiments, the widgets include a widget such that a prescribed action is only taken if a certain threshold of activity is surpassed over a given time.

In some embodiments, each widget has settings or switches, the switches including a kill switch to apply or ignore the widget.

In some embodiments, a security widget comprises code to implement security controls to process and inspect network traffic for a web application, the security controls for different types of detection in a given portion of data exchange with a web application.

In some embodiments, the security stack provides the order of execution for the widgets by assigning an execution priority value to each widget to define timing data for execution of the respective widget.

In some embodiments, the signature detection comprises custom signature detection and attack signature detection.

In some embodiments, the security widgets comprises code to implement virtual patch protection to remediate application security vulnerabilities through HTTP response modification.

In some embodiments, the behaviour analysis detection comprises code to implement behavioral analysis type of detection to blacklist addresses and perform pattern detection.

In some embodiments, the signature detection comprises code to implement custom signature type of detection to detect references to malicious domains and complex multi-staged signatures.

In some embodiments, the signature detection comprises code to implement attack signature type of detection to track and determine frequency of signature detection for cumulative tolerance attack sets.

In some embodiments, a widget implements at least one WAF event listener to enable the widget to interact with inbound and outbound network traffic, wherein the WAF event listener declares a priority value for the security stack to determine the order of execution.

In some embodiments, a security widget implements a set of switches to allow granular flow control, the set of switches comprising at least one of a kill switch, enforcement switch and a block switch, the kill switch providing the ability to disable a security control at a policy level, the enforcement switch providing the ability to set a control in either detection or protection mode, the block switch providing the ability to force the control to reset a TCP connection instead of sending back a violation message through a HTTP response.

In some embodiments, a widget is an attack signature set to enable different types of tolerance for a particular activity relating to a web application, the different types of tolerance being zero tolerance and cumulative tolerance.

In some embodiments, the security widgets comprises a set of security widgets relating to inbound traffic flow and another set of security widgets relating to outbound traffic flow, wherein the set of security widgets relating to inbound traffic flow comprise an abusive session control, a domain control, and a signature control, wherein the set of security widgets relating to outbound traffic flow comprise a signature control and virtual patch protection.

In some embodiments, a security widget has one or more thresholds, the thresholds relating to volume thresholds or time thresholds.

In another aspect, embodiments described herein provide a process for firewall system. The process involves, at a processor, receiving a request at a web application to process network traffic; triggering an initialization state control widget; processing the network traffic using security widgets having security logic to implement behaviour analysis detection, custom signature detection for the request, and attack signature detection based on the request for attack signatures; triggering a post-inbound state control widget; processing the network traffic using the set of security widgets having security logic to implement custom signature detection for the response, and standard attack signature detection for the response; triggering a post-outbound state control widget; implementing viral patch protection; and triggering the finalization state control widget.

In some embodiments, the initialization state control widget provides a placeholder for security state logic to be executed as soon as the request is received and prior to any security detection by the security widgets.

In some embodiments, the post-inbound state control widget provides a placeholder for security state logic to be executed after the request has been inspected for possible attack violation and before it is either sent to the web application or rejected all together.

In some embodiments, the post-outbound state control widget provides a placeholder for security state logic to be executed after the response has been inspected for possible attack violation and before virtual patching.

In accordance with an aspect, there is provided a framework for a web application firewall. In accordance with an aspect, there is provided a framework for a web application firewall single policy model. A policy model can be implemented using computer code to specify and enforce security policies. A web application is a client server computer program in which the client can run in a web browser. A web application can also refer to an application on a mobile device, for example, that may not have a web browser but uses a client server model.

In accordance with another aspect, there is provided a framework to layer on top of a firewall platform. The firewall framework provides web application-specific widgets that may be toggled and configured to enable/disable certain firewall actions on a per-application basis, and that can be easily updated without requiring any programming from the end user. The framework can involve a security stack. The security stack provides the ability for a single policy model to be used for the firewall, while also allowing per-application customizations.

As used in the security stack, a widget is an application of program code that provides particular firewall control functionality. Widgets of different types are processed in the security stack. If a widget is not to be used for a particular web application, it can be bypassed for that application's traffic. Only after passing through all of the toggled security widgets will inbound network traffic get past the firewall. For traffic leaving the financial institution network, different security widgets may also be applied to conduct analysis. The traffic leaving the financial institution network passes through all of the toggled widgets for outbound processing. If the traffic is cleared through those widgets, the outbound traffic may still be modified or "patched" before being sent out, particularly where the web application has a known vulnerability.

In the event that a web application has received an exemption from any of the implemented security widgets, or from firewall filtering overall, its traffic may still be processed by the firewall framework. In that case, if any security widget is flagged by any traffic for that web application, it will be logged and an internal notification may be sent. For example, the internal notification can suggest that the application should have its exemption revoked.

In addition to the overall concept of the security stack, embodiments described herein relate to individual security widgets. For example, widget functionality may implement different types of tolerance for particular activity. If zero tolerance, any triggering of the widget can result in the widget performing a prescribed action.

Embodiments described herein relate to "cumulative tolerance" such that a prescribed action may only be taken if a certain threshold of activity is surpassed over a given time period. This can help to avoid triggering excessive false positives while also being able to try to capture types of network attacks that come in at a slow rate over time.

Each widget may have settings or switches associated with it, such as a kill switch to apply or ignore the widget.

Many further features and combinations thereof concerning embodiments described herein will appear to those skilled in the art following a reading of the instant disclosure.

DESCRIPTION OF THE FIGURES

Embodiments will now be described, by way of example only, with reference to the attached figures, wherein in the figures.

DETAILED DESCRIPTION

Figure 1:
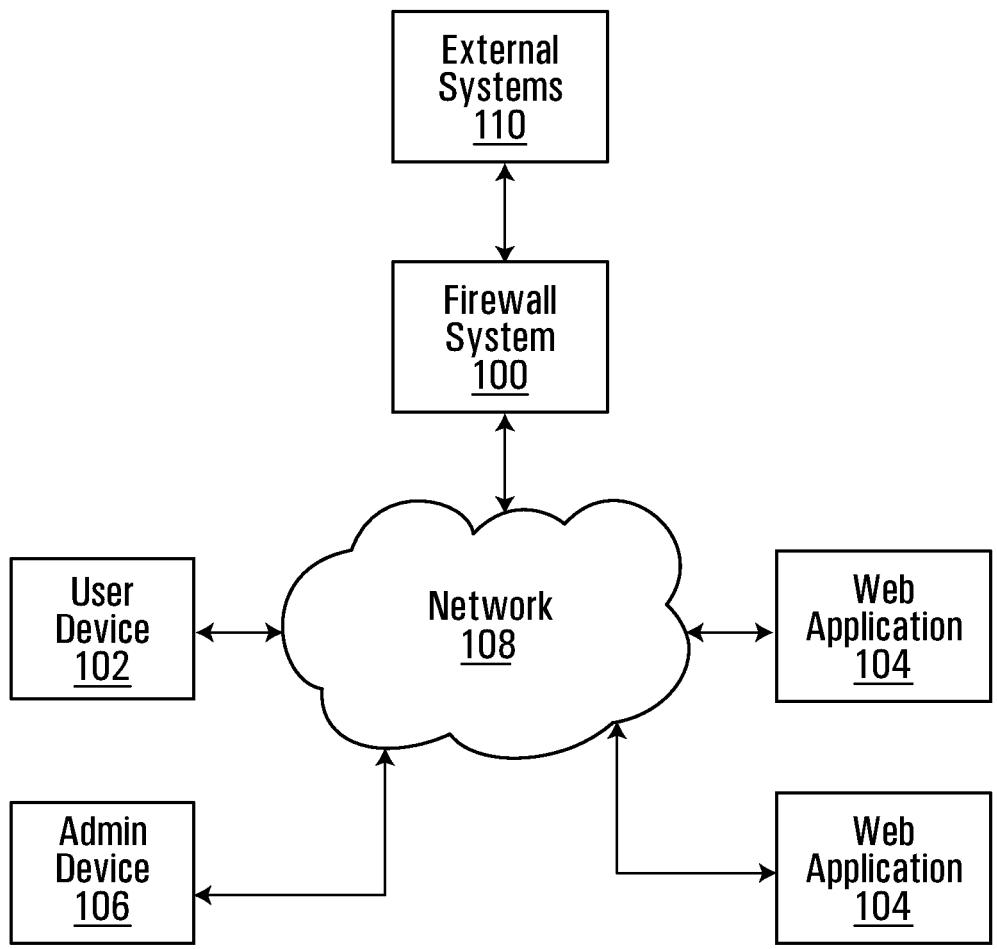
FIG. 1 is a diagram of a firewall system according to some embodiments.

FIG. 1 shows an example firewall system 100 according to some embodiments. The firewall system 100 provides a framework for a web application firewall. The framework can be used to implement a web application firewall single policy model. As shown, firewall system 100 connects to web application 104 via network 108. Firewall system 100 also connects to one or more user devices 102 and one or more administrator devices 106. Firewall system 100 can exchange data with internal systems or external systems 110.

Firewall system 100 provides a framework to layer on top of a firewall platform. A firewall platform can include configured hardware and software to implement technological barriers to prevent unauthorized or unwanted communications between computer networks or hosts. The firewall system 100 provides widgets specific to web applications 104 that may be toggled and configured to enable or disable certain firewall actions on a per-application basis. The firewall system 100 and widgets can be easily updated without requiring any programming from the end user. The widgets can be toggled and configured by user device 102 and administrator device 106. The firewall system 100 framework comprises a security stack to be described further in relation to FIG. 6. Various widgets that can be generated and used by the firewall system 100 are described herein, including security widgets and state control widgets. The widgets can be activated and toggled for web applications 104 to provide a flexible policy framework specific to particular web applications 104. The security stack provides the ability for a single policy model to be used for the firewall, while also allowing per-application customizations.

As used in the security stack, a widget is an application of program code that provides particular firewall control functionality for web application 104. Widgets of different types are processed in the order defined by the security stack. That is, the security stack defines the order of widgets to process incoming or outbound network traffic. If a widget is not to be used for a particular web application, it can be bypassed for that web application's 104 traffic. Only after passing through all of the toggled security widgets will inbound network traffic get past the firewall system 100. The activation of the security widget can be defined in the security stack. The security stack can include code for activation configurations to toggle the security widgets for activation or de-activation. For traffic leaving the financial institution network 108, different security widgets may also be applied to conduct analysis. If the traffic is cleared through the widgets for a web application 104 and reaches an outbound control widget (which may be referred to as a Post Outbound State Control Widget herein), the outbound traffic may still be modified or patched before being sent out to internal systems or external systems 110, particularly where the web application 104 has a known vulnerability. User device 102 may exchange data with web application 104 and that data can be network traffic that can be filtered by firewall system 100. Administrator device 106 can configure widgets and the security stack for firewall system 100.

In the event that a web application 104 has received an exemption from any of the implemented security widgets, or from filtering overall by firewall system 100, its traffic may still be processed by the firewall system 100. In that case, if any security widget is flagged by any traffic for that web application 104, it will be logged and an internal notification may be sent perhaps suggesting that the web application 104 should have its exemption revoked.

Figure 2:
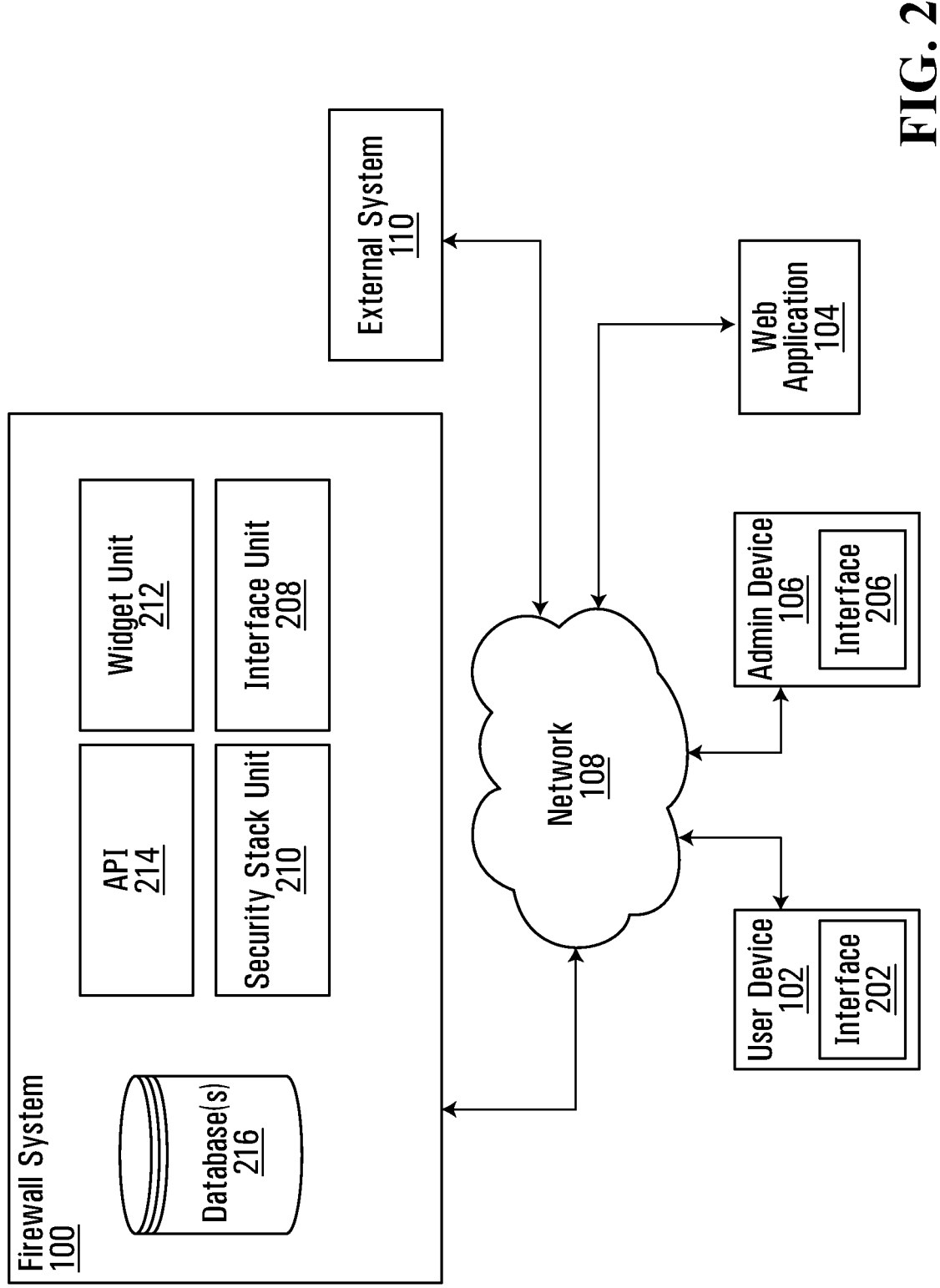
FIG. 2 is a diagram of a firewall system according to some embodiments.

FIG. 2 is a diagram of a firewall system according to some embodiments. Firewall system 100 can include an interface unit 208, a security stack unit 210, an application programming interface (API) 214, a widget unit 212, and databases 216 for storing firewall related data. Security stack unit 210 configures and creates security stacks for web applications 104. The security stack defines a processing order for widgets. The processing order can define the order for widgets to process traffic. The security stack can also include an attack signature set. The security stack provides the ability for a single policy model to be used for the firewall system 100, while also allowing customizations for specific web applications 104. The widget unit 212 generates and configures widgets for processing by security stack. The widget unit 212 enables generation of different types of widgets including security widgets and state control widgets. The widgets can be toggled and configured to enable and disable certain firewall actions on a per application basis. A widget is code segment that provides particular firewall control functionality periods. Widgets of different types are processed in the order defined by a security stack. If it widget a not used for particular web application 104 it is simply bypassed for that web application's 104 traffic. Only after passing through all of the toggled security widgets will inbound network traffic get past the firewall system 100. Network traffic for a particular web application 104 is processed by different security widgets. There can be many different types of security widgets. For example, a widget can define different types of tolerance for particular activities. If the widget defines zero-tolerance then any triggering of the widget would result in the widget performing a prescribed action. For varied tolerance, a prescribed action may only be taken if a certain threshold of activity is surpassed over a given time period. This may help avoid triggering excessive false positives while also being able to try to capture different types of network attacks that can come in at a slow rate over time. Each widget may have settings or switches associated with it such as a kill switch to apply or ignore the widget. Further details of widgets will be described herein. The interface unit 208 can generate and update an interface 202 for display at user device 102 or an interface 206 for display at administrator device 106 to configure security stacks and widgets.

The firewall system 100 also includes an API 214 for widget development. The API 214 can integrate with widget unit 212 to configure and develop widgets. The API 214 supports the framework and provides an abstraction layer to the underlying security product. The API 214 allows security developers to build widgets with ease and consistency. The API 214 defines methods delivered through multiple virtual objects. A virtual object is syntax based naming convention simulating a desired object based grouping, normally found in compiled languages.

Figure 3:
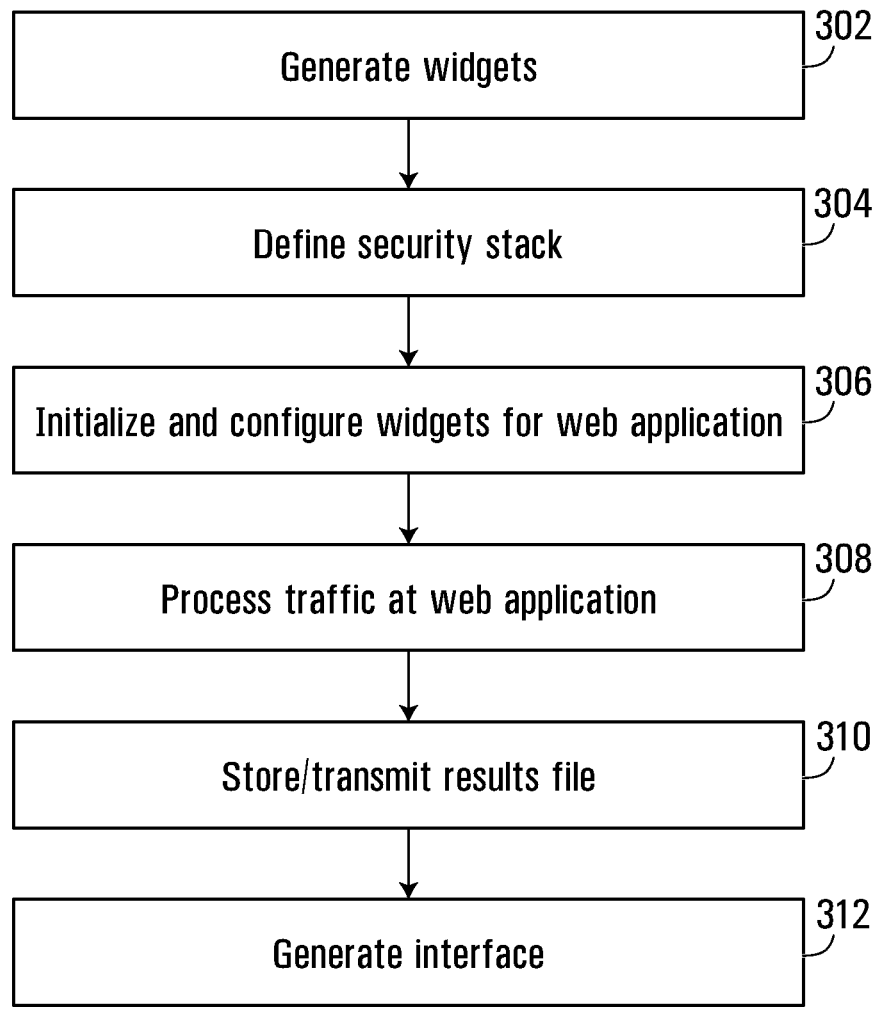
FIG. 3 is a diagram of a process for a web application firewall according to some embodiments.

FIG. 3 is a diagram of a process for a web application firewall according to some embodiments. At 302, the firewall system 100 generates widgets 302. As noted there may be different types of widgets such as security widgets and state control widgets. At 304, the firewall system 100 defines or creates a security stack for a particular web application 104. The security stack defines an order for widgets to process network traffic. At 306, the firewall system 100 initializes and configures widgets for a particular web application 104. As noted, the firewall system 100 enables customization for particular web applications 104 such that a set of widgets can be toggled or activated for processing network traffic related to the particular publication 104. At 308, the firewall system 100 processes network traffic for the web application 104. At 302, the firewall system 100 stores and transmits the results file relating to the network traffic processing. The results file can include data regarding potential attacks and other results received from widgets. This can generate a log file for the network traffic. At 312, firewall system 100 generates interface 202, 206 to update the security stack, view log files of the processing results, toggle widgets for particular web applications 104, and so on. The operations of the process for the web application firewall can be executed in different orders.

Figure 4:
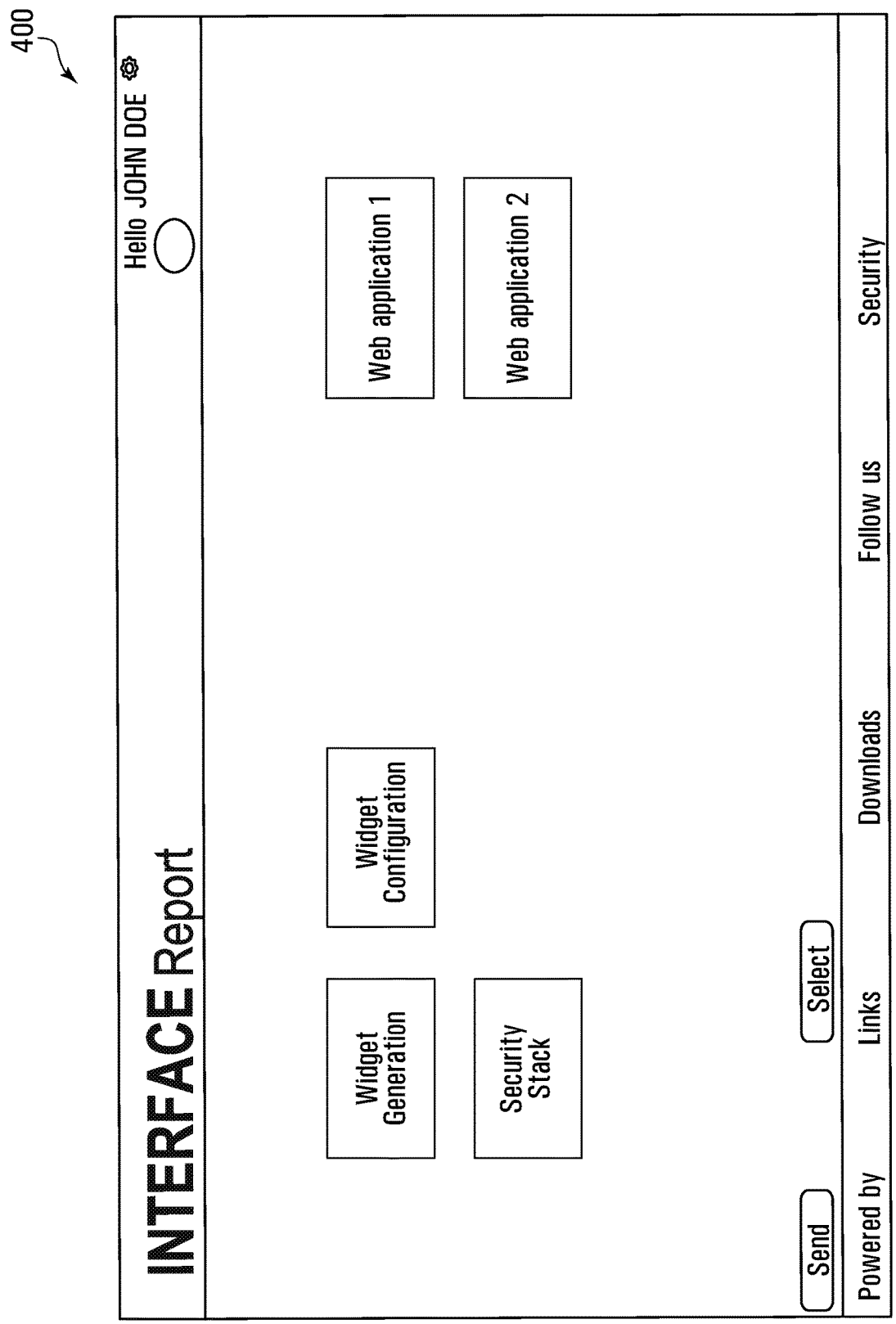
FIG. 4 is a diagram of an interface for a web application firewall according to some embodiments.

FIG. 4 is a diagram of an interface 202, 206 for a web application firewall according to some embodiments. The interface 202, 206 can be used to define a security stack, generate widgets, toggle or configure widgets for particular web applications 104, and so on. The interface 202, 206 can be used to exchange data with web applications 104 as inbound and outbound data for firewall system 100. The interface can include different indicia implement as a visual elements that can be activated to initiate different processes, such as the creation of widgets, for example.

Figure 5:
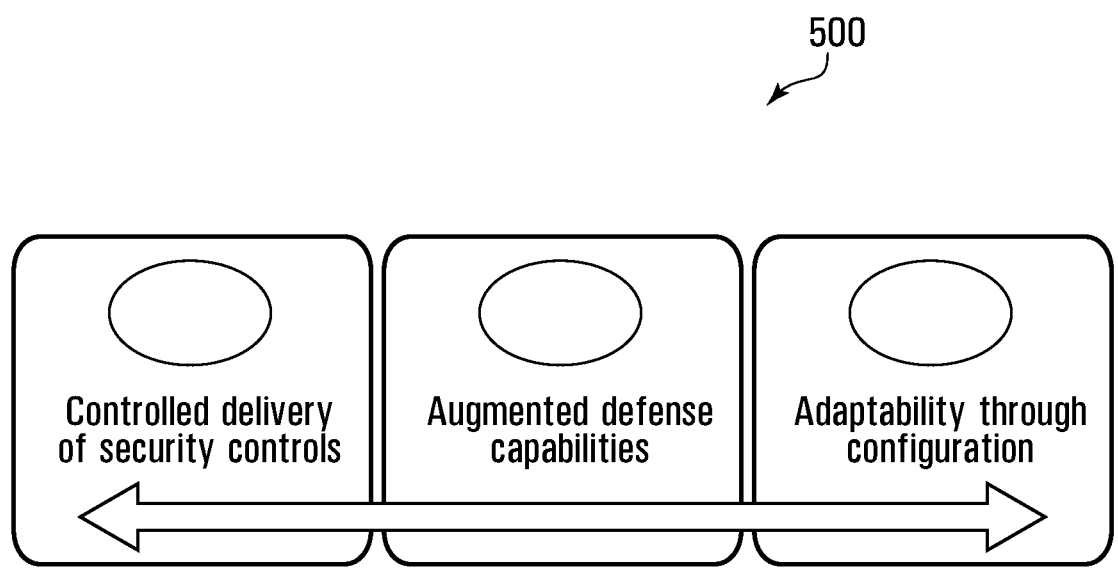
FIG. 5 is a diagram of an overview of the firewall system framework.

FIG. 5 is a diagram of an overview of the firewall system framework. The firewall system 100 can control delivery of security controls. The firewall system 100 can provide augmented defense capabilities. The firewall system 100 can provide adaptability through configuration.

The firewall system 100 provides a new and innovative web application firewall (WAF) policy model that can enable on organization to better its security posture while ensuring no business disruption. The firewall system 100 can promote consistency of security controls across all applications. The firewall system 100 can minimize support and operational requirements. The firewall system 100 can de-couple administration from engineering.

In some embodiments, the firewall system 100 can provide a flexible solution with a focus on our business partner's challenges. The firewall system 100 can implement dynamic, effective and valuable defenses to augment our application security posture. The firewall system 100 can implement virtual patches to address standard application vulnerabilities. The firewall system 100 can implement meaningful notifications to provide actionable intelligence to stakeholders.

A WAF policy model based on previous approaches can be difficult to implement into a large and dynamic organization such as an established financial institution. A hurdle can be associated with the policy structure, which can confine an organization to only a couple of approaches. An example approach can be to develop application based policies or a policy tailored specifically for an application. This approach can lead to costly development and maintenance with strenuous administration. Another example approach is to develop vulnerability based policies or a policy tailored not to disrupt normal operation of selected applications. This may provide reduced protection.

In addition to the structure limitation, policy attributes themselves can contribute to the rigidity of the current model. For example, a policy can only be deployed in two global enforcement modes: transparent mode and a blocking mode. The enforcement mode applies to all the security controls in the policy. An exception is the attack signatures themselves which can be in alarm mode only regardless of the enforcement mode. Signatures that trigger false positives must be abandoned. Some customizable policy settings are prone to conflicts between applications where component names are the same, while having different behaviors and/or security needs, e.g. application cookies.

In addition, the organization can also face cultural challenges which unfortunately resulted in very little support to implement a WAF in blocking mode. The following provide examples of feedback provided from different organizations involved in firewall policy development. Infrastructure partners can be opposed to solutions that require complex customization per application. Business partners can be opposed to any security controls that could disrupt normal business operation. Threats should be addressed.

Embodiments described herein provide a firewall system 100 that includes a framework and an API. The framework can define an ecosystem of innovative capabilities and integrated communication channels. The WAF security controls the components and concepts implemented by the framework to support the attributes shown in FIG. 5.

The table provides a high level perspective on the components and concepts implemented by the framework of firewall system 100:

|  | Element | Description |
| --- | --- | --- |
| Component | Security Widget | Security widgets are small to medium amounts of code enabling the controlled delivery of existing, enhanced or net new security capabilities through an existing platform.<br>Individual security controls are referred as Security Widgets |
|  | State Control Widget | State control widgets are small amounts of code used for decision making at various key points of the workflow<br>These controls provide the ability to analyze state, activated defenses, custom switches and determine how to further proceed with the workflow |
| Workflow | Security Stack (Workflow) | The security stack is primarily defined as a collection of integrated widgets: State Control Widgets and Security Widgets<br>Widgets implement WAF event listeners and execution priority value to define the exact timing by which they will participate in the security stack<br>The WAF event listeners allows a widget to interact with the incoming and/or outgoing traffic<br>Security widgets can either operate independently from one another or alter their function based on shared information |
| Configuration | Switches | Kill Switch allows for the control to be disabled across the board<br>Enforcement Switch allows for the control to be in either detection or protection mode<br>Network Block Switch allows for the control to reset the TCP connection in lieu of sending back a violation message |
|  | Exception List | Application exception list allows for an application to be exempted from a security control<br>Application Component allows for an application component to be exempted from a security control |

| Element | | Description |
|---|---|---|
| | Threshold | Volume can refer to the number of violation instances to measure against<br>Time Window can refer to the amount of seconds to factor in for frequency evaluation or penalty against a given IP |
| Attack Signature Set | Grouping | Zero Tolerance can refer to the grouping of signatures that are deemed mandatory by the organization<br>Cumulative Tolerance can refer to the grouping of signatures that will be evaluated based on their frequency of appearance |

Figure 6:
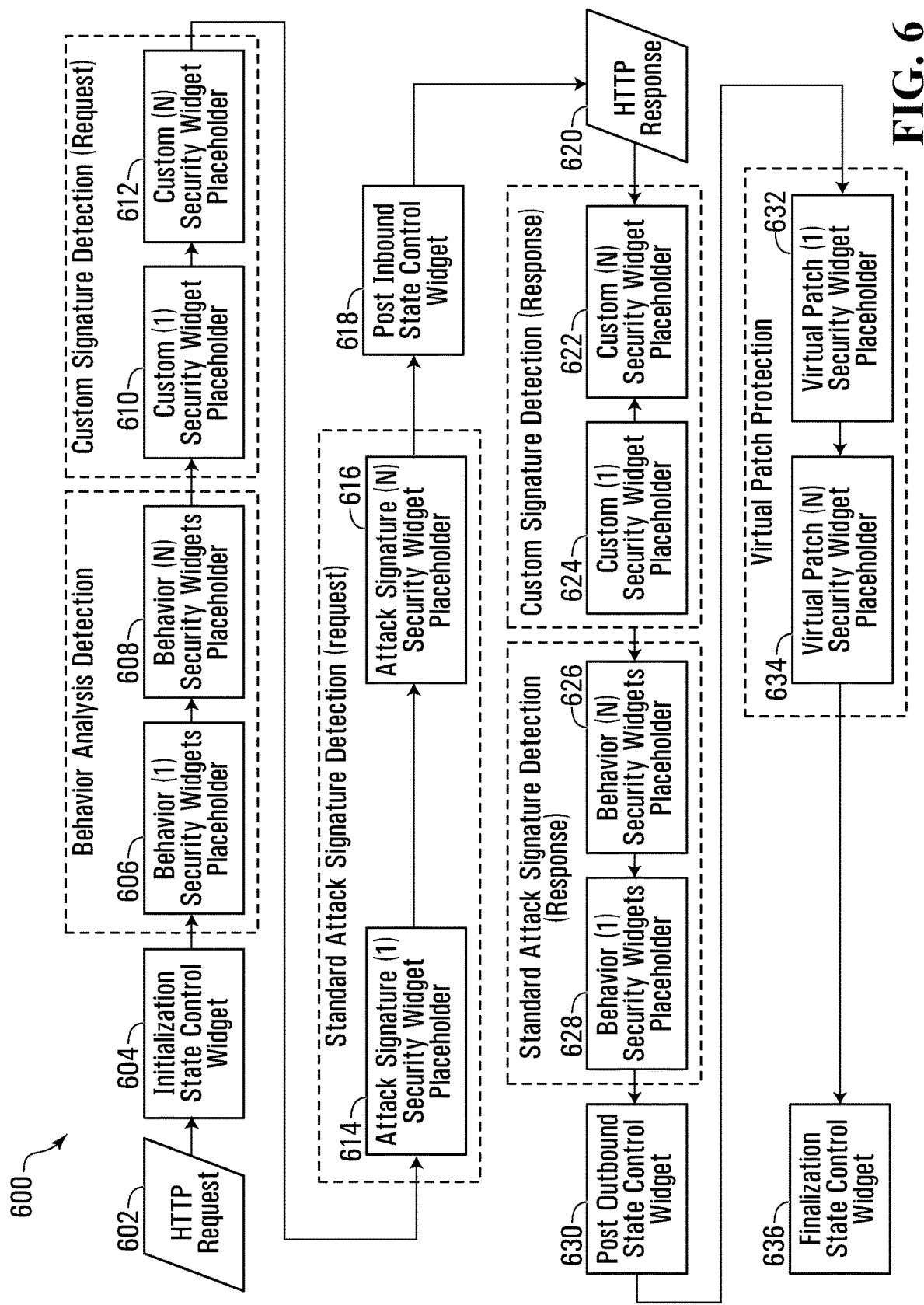
FIG. 6 is a diagram of a security stack process according to some embodiments.

FIG. 6 is a diagram of a security stack process 600 according to some embodiments. The security stack is a chain process to govern the order of execution of all state control and security widgets in the security stack(s).

At 602, an HTTP request can trigger a security stack. At 604, the security stack involves initialization of a state control widget. At 606, 608, the security stack implements behavior analysis detection for the security widgets. At 610, 612, the security stack implements request custom signature detection for the security widgets. At 614, 616, the security stack implements standard attack signature detection for attack signatures associated with the security widgets. At 618, the security stack triggers the "Post Inbound State Control Widget" when inbound network traffic goes past the firewall. The security stack defines the placement for each widget based on their type and function performed. At 620, the security stack implements a response to the request. At 622, 624, the security stack implements response custom signature detection for the security widgets. At 626, 628, the security stack implements response standard attack signature detection for attack signatures associated with the security widgets. At 630, the security stack implements a post-outbound state control widget when outbound traffic goes past the firewall. At 632, 634, the security stack implements virtual patch protection for the security widgets. At 636, the security stack implements finalization using a state control widget. This provides an example process 300 for the security stack. The security stack can define an order for different security widgets (1 . . . N) applicable to a particular web application 104. The security stack can toggle different security widgets (1 . . . N) for a particular web application 104.

The security stack can provide an oversight on the security widgets and their respective functions. The framework defines state control widgets. The state control widgets allow for security state logic to be executed at key points in time in the security stack. The table provides an example function breakdown for each widget:

| Type | Function | Description |
|---|---|---|
| State Control Widget | Initialization State Handling | Provides a placeholder for security state logic to be executed as soon as the HTTP Request is received and prior to any security detection. The logic can function to: initialize sessions; reset counters; and centralize global values. |
| | Post Inbound State Handling | Provides a placeholder for security state logic to be executed after the HTTP Request has been inspected for possible attack violation and before it is either sent to application or rejected all together. The logic can function to: control whether the HTTP Request should be blocked instead of being sent to the application; and modify HTTP Headers before being sent to the application. |
| | Post Outbound State Handling | Provides a placeholder for security state logic to be executed after the HTTP Response has been inspected for possible attack violation and before Virtual Patching. |
| | Finalization Handling | Provides a placeholder for security state logic to be executed at the very end of the workflow |

The security stack can provide a framework that can implement both an "Initialization" and "Post Inbound" state control widget.

To provide comprehensive layer 7 security coverage, the framework can define distinct placeholders for security widgets, for example. Each placeholder can represent a specific type of detection in a given portion of the HTTP Request/Response data exchange. The below table provides an example function breakdown for each them:

| | Function | Description |
|---|---|---|
| Security Widget | Behavioral Analysis Detection | Provides a placeholder for logic that handles behavioral analysis type of detection such as for example: to blacklist IP; and to perform pattern detection. |
| | Custom Signature Detection | Provides a placeholder for logic that handles custom signature type detection, for example to: detect references to malicious domain; detect complex multi-staged signatures. A separate placeholder is defined for the HTTP Request and Response |
| | Standard Attack Signature Detection | Provides a placeholder for security logic that controls how attack signature sets behave, for example to: track and analyze the frequency of signature detection for cumulative tolerance attack sets. A separate placeholder is defined for the HTTP Request and Response |
| | Virtual Patch Protection | Provides a placeholder for security logic that needs to be executed to remediate application security vulnerabilities through HTTP response modification |

Although each function type is optional, the framework can require that a minimum of one function type be implemented. In some example embodiments, the firewall system 100 can indicate that all widgets implement 1-N WAF event listeners and execution priority value to define the exact timing by which they will participate in the security stack.

The firewall system 100 involves different types of widgets that implement different functions. An example widget type is a security widget. Another example widget type is a state control widget. Another example widget type is an attack signature set.

Each security widget can implement at least one WAF event listener. WAF event listeners allow a security widget to interact with the inbound and/or outbound traffic. WAF event listeners can be declared with a priority value to determine their order of execution. The priority value can align with the widget placement in the security stack as well as the direction of the HTTP traffic intended to be analyzed and/or modified. The direction of the traffic may be a response or a request.

Each security widget can implement a suite of switches to allow granular flow control. These switches can be controlled by configuration lists external to the policy. The table below provides the function and description of each switch.

| | Function | Description |
|---|---|---|
| Switches | Kill | Provides the ability to disable a security control at the policy level. This functionality can be used for: urgently shutdown a problematic widget; de-coupling deployment and operation of new security controls |
| | Enforcement | Provides the ability to set a control in either detection or protection mode. This functionality can be used for: deploying new security control progressively and determining unforeseen application impact; gathering metrics regarding a particular threat. |
| | Network Block | Provides the ability to force the control to reset the TCP connection instead of sending back a violation message through the HTTP response. This functionality is primarily used for: disrupting automated vulnerability scanners and processes attacking applications. |

Each security widget can implement an exception switch. The switch can be controlled by configuration lists associated to the widget and external to the policy. The exception granularity varies per security widget ranging from the application as a whole to an application component e.g. cookie. The configuration list can facilitate the integration and management via a separate solution e.g. IT Risk exception process.

Each security widget can implement event logging to provide a clear depiction of an attack. The event logging can be referred to as a results file. A security widget can generate a results file. Both attack detection and exception conditions can be logged in the results file. The table provides example conditions that can trigger event logging.

| | | Condition | | |
|---|---|---|---|---|
| Behavioral Analysis | Custom Signature | Standard Attack Signature | Vulnerable Response | Exception |
| Undesired behavior Offending IP | Attack type Offending Input | Attack type Associated signature set Offending Input | Application vulnerability requiring a patch | Exempted application Triggered Violation |

Each security widget can contribute to the aggregation of attack volume monitored by other security widgets.

Another example widget type is a state control widget. Each state control widget can implement at least one WAF event listener. WAF event listeners can allow a widget to interact with the inbound and/or outbound traffic. WAF event listeners can be declared with a priority value to determine their order of execution. The priority value aligns with the widget placement in the security stack as well as the direction of the HTTP traffic intended to be analyzed and/or modified. In some embodiments, session based variables are declared with a "vg" prefix. The prefix can be used as a clear indicator that the variable is global in scope and will exist across all other state control and security widgets in the security stack.

Another example widget type is an attack signature set. The attack signature sets enable different types of tolerance for a particular activity. A zero-tolerance set can indicate that any triggering of the widget results in the widget performing the prescribed action. A cumulative tolerance can indicate that a prescribed action may only be taken if a certain threshold of activity is surpassed over a given time period. This may help avoid triggering excessive false positives will also being able to try to capture different types of network attacks that come in at a slow rate over time, for example. Accordingly, the implemented attack signatures can be inserted into one of the following two example groups: (1) Zero Tolerance; (2) Cumulative Tolerance.

Zero tolerance represents signatures that are mandatory and will be blocked right away. Cumulative tolerance signature represents signatures that by themselves may trigger too many false positive. Instead of simply abandoning these types of signatures, they can be bundled and analyzed based on the frequency of occurrence in a pre-defined timeframe, for example. This approach allows the firewall system 100 to still leverage signatures that could occur naturally during the course of normal application operation and be able to detect inappropriate use indicative of an attacker's methodology. A signature can refer to a pattern or set of data in the network traffic data associate with a particular web application 104.

Accordingly, firewall system 100 can include built-in security widgets. The security widgets can relate to inbound traffic flow. Example security widgets include behavioral analysis widgets and signature detection widgets. The following tables describe attributes for inbound traffic flow including an abusive session, for a domain, and signature.

| Behavioral Analysis Detection | |
|---|---|
| Abusive Session | This control can identify an attack in progress by evaluating the volume of malicious attempts sent by an IP during a time window<br>The volume of attacks is determined through contributing security widgets<br>IP in violation will be deemed abusive and be blocked for a period of time |

| Custom Signature Detection |
|---|
| This control can identify attacks embedding unexpected domain in parameters of the HTTP request<br>Many injection based attacks will require leveraging a foreign domain for their attack to be truly beneficial. The domain is typically used for either additional payload or exfiltration of data<br>All name/value pairs (Query string or within the request body) as well as HTTP headers are inspected<br>The widget is supported by two configuration lists to assist in the classification of discovered domain.<br>The first one is a whitelist to ensure valid domain can be excluded from detection<br>The second one is a list of domains leveraged by known commercial/open source tools to better the confidence level of vulnerability detection<br>The configuration list allows for the segregation between malicious and operational domain<br>The strategy is new and focuses on going after essential elements of an attack instead of pure syntax matching<br>Request in violation will be blocked in accordance to the enforcement and network block switches |

| Standard Attack Signature Detection | |
|---|---|
| Signature (Generic) | The intent of this control blueprint is to handle standard signature violation of a given attack type in accordance to the established signature grouping<br>Zero tolerance signature will be immediately blocked in accordance to the enforcement and network block switches<br>Cumulative tolerance signature are by default allowed through until the volume received from an IP, during a given period of time exceeds a threshold<br>Once exceeded, cumulative tolerance signature of a given attack type will be treated as zero tolerance for a pre-determined period of time |

The security widgets can relate to outbound traffic flow. The following tables describe attributes for outbound traffic flow:

| Custom Signature Detection | |
|---|---|
| 404 | The intent of this control is identifying a discovery exercise in progress by evaluating the volume of HTTP response code 404 generated by the application during a time window<br>Request in violation will be handled in accordance to the enforcement and network block switches for a period of time. In normal block mode, the response will be handled by the security stack instead of the targeted application<br>This control contributes to the overall volume of attack monitored by the abusive session control |

| Standard Attack Signature Detection | |
|---|---|
| Signature (Generic) | The intent of this control blueprint is to handle standard signature violation of a given attack type in accordance to the established signature grouping. Due to underlying product limitation, all standard signature applied to the HTTP response are set as cumulative. Zero tolerance behavior can be simulated by setting the threshold to exceed at 0<br>Cumulative tolerance signature are by default allowed through until the volume received from an IP, during a given period of time exceeds a threshold<br>Once exceeded, cumulative tolerance signature of a given attack type will be treated as zero tolerance for a pre-determined period of time |

| Virtual Patch Protection | |
|---|---|
| | The intent of this control blueprint is to remove any HTTP headers from the HTTP Response matching a pre-defined list. This sanitization control is mainly used to remove information leakage revealing application implementation e.g. Web server version/patch level; Development platform/tools version/patch level<br>Software version/patch level are used by attackers to easily discover unpatched system and associated vulnerabilities |
| Cookies | The intent of this control is to automatically add missing security attributes on sensitive cookie to protect it against hijacking |
| | HTTP Only - Provides a directive to the browser not to make the cookie available to client-side Javascript<br>Secure - Provides a directive to the server not to transmit the cookie over a non-SSL channel |
| CORS | The intent of this control is to prevent by default an application to allow all domain to make AJAX request to its resources. Cross origin resource sharing should be whitelisted if multiple domain are required<br>The control will remove any instances of the HTTP header "Access-Control-Allow-Origin" set to "*" |
| Click-jacking | The intent of this control is to automatically add any missing HTTP headers/security attributes required to protect the application resources against clickjacking across all major browsers |
| Cache Control | The intent of this control is to automatically add missing HTTP headers/security attributes to ensure sensitive content is not cached locally by the browser |

In some embodiments, each widget can have setting or switches associated with it. Each widget is configured for particular settings or switches for a particular web application 104. An example is a kill switch to apply or ignore the widget. The following table provides different example switches for widgets including kill switches, enforcement switches and network block switches.

| Switch | Values | Flow Control |
|---|---|---|
| Kill | 1 | Indicates that the security widget should be ignored |
| | 0 | Indicates that the security widget should be applied |
| Enforcement | 1 | Indicates that security widget should block an attack or patch a detected vulnerability depending on the function performed |
| | 0 | Indicates that the HTTP Request should not be blocked nor should the HTTP Response be blocked or patched |
| Network Block | 1 | Indicates that the security widget should reply with a TCP reset or packet drop when an attack is detected<br>The implementation will be dependent on the position of the WAF within the infrastructure. Packet drop should be implemented where possible. Both TCP Reset or packet drop will negatively impact automated vulnerability scanner causing them to either decrease in performance by waiting for the dropped packets or interpreting the TCP reset as communication problem with the application.<br>Packet drop is the most impactful methodology to decrease the ROI of the attacker. |
| | 0 | Indicates that the security widget should reply with a typical rejection message when an attack is detected |

In some embodiments, a security widget may have one or more thresholds associated with it. The thresholds can include volume thresholds, time thresholds, and so on. The following table list example configuration items to control the frequency and time window attributes of security widgets

| WAF Deployment | Widget | Volume | Time Window (seconds) | Penalty |
|---|---|---|---|---|
| Hot/Hot | Abusive Session | Abusive-Volume-HH Maximum number of malicious HTTP requests to be exceeded | Abusive-TimeWindow-HH Time window used to evaluate frequency of malicious HTTP requests | Abusive-Jail-TimeWindow-HH Time window an offending IP is blacklisted for |

-continued

| WAF Deployment | Widget | Volume | Time Window (seconds) | Penalty |
|---|---|---|---|---|
| | Command Execution | COMEXEC-Volume-Cumulative-HH Maximum number of malicious HTTP requests to be exceeded | COMEXEC-TimeWindow-HH Time window used to evaluate frequency of malicious HTTP requests | NA |
| | SQLi | SQLI-VolumeCumulative-HH Maximum number of malicious HTTP requests to be exceeded | SQLI-TimeWindow-HH Time window used to evaluate frequency of malicious HTTP requests | NA |
| | XSS | XSS-VolumeCumulative-HH Maximum number of malicious HTTP requests to be exceeded | XSS-TimeWindow-HH Time window used to evaluate frequency of malicious HTTP requests | NA |
| | LDAP | LDAP-VolumeCumulative-HH Maximum number of malicious HTTP requests to be exceeded | LDAP-TimeWindow-HH Time window used to evaluate frequency of malicious HTTP requests | NA |
| | XPATH | XPATH-VolumeCumulative-HH Maximum number of malicious HTTP requests to be exceeded | XPATH-TimeWindow-HH Time window used to evaluate frequency of malicious HTTP requests | NA |
| | 404 | 404-VolumeCumulative-HH Maximum number of discovery HTTP requests to be exceeded | 404-TimeWindow-HH Time window used to evaluate frequency of discovery HTTP requests | NA |
| | Directory Indexing | DIRECTORY-VolumeCumulative-HH Maximum number of malicious HTTP requests to be exceeded | DIRECTORY-TimeWindow-HH Time window used to evaluate frequency of malicious HTTP requests | NA |
| Hot/ Standby | Abusive Session | Abusive-Volume-HS Maximum number of malicious HTTP requests to be exceeded | Abusive-TimeWindow-HS Time window used to evaluate frequency of malicious HTTP requests | Abusive-Jail-TimeWindow-HS Time window an offending IP is blacklisted for |
| | Command Execution | COMEXEC-Volume-Cumulative-HS Maximum number of malicious HTTP requests to be exceeded | COMEXEC-TimeWindow-HS Time window used to evaluate frequency of malicious HTTP requests | NA |
| | SQLi | SQLI-VolumeCumulative-HS Maximum number of malicious HTTP requests to be exceeded | SQLI-TimeWindow-HS Time window used to evaluate frequency of malicious HTTP requests | NA |
| | XSS | XSS-VolumeCumulative-HS Maximum number of malicious HTTP requests to be exceeded | XSS-TimeWindow-HS Time window used to evaluate frequency of malicious HTTP requests | NA |
| | LDAP | LDAP-VolumeCumulative-HS Maximum number of malicious HTTP requests to be exceeded | LDAP-TimeWindow-HS Time window used to evaluate frequency of malicious HTTP requests | NA |
| | XPATH | XPATH-VolumeCumulative-HS Maximum number of malicious HTTP | XPATH-TimeWindow-HS Time window used to evaluate frequency | NA |

| WAF Deployment | Widget | Volume | Time Window (seconds) | Penalty |
|---|---|---|---|---|
| | 404 | requests to be exceeded 404-VolumeCumulative -HS Maximum number of discovery HTTP requests to be exceeded | of malicious HTTP requests 404-TimeWindow-HS Time window used to evaluate frequency of malicious HTTP requests | NA |
| | Directory Indexing | DIRECTORY-VolumeCumulative-HS Maximum number of malicious HTTP requests to be exceeded | DIRECTORY-TimeWindow-HS Time window used to evaluate frequency of malicious HTTP requests | NA |

In some embodiments, a widget may have a virtual patch associated with it for compliance reporting. The compliance reporting may be stored in a results file to provide an event log or example. The following table list example configuration items to control the frequency of application compliance reporting

| WAF Deployment | Virtual Patches | Time Window (seconds) |
|---|---|---|
| Hot/Hot | Applied | ComplianceReporting-TimeWindow-HH Time window used to determine the frequency of reporting vulnerability patching for one application |
| | Exempted | ComplianceExceptionReporting-TimeWindow-HH Time window used to determine the frequency of reporting vulnerable application exempted from the protection |
| Hot/Standby | Applied | ComplianceReporting-TimeWindow-HS Time window used to determine the frequency of reporting vulnerability patching for one application |
| | Exempted | ComplianceExceptionReporting-TimeWindow-HS Time window used to determine the frequency of reporting vulnerable application exempted from the protection |

In some embodiments, widgets may have lists associated there with. An example list relates to Hot-Hot WAF Deployment security widget. The framework can involve the creation of a list of application deployed in a hot-hot configuration. The API 214 can provide for the systematic and appropriate selection of configuration for the widgets. In some example configurations, a list can depict the VIP sitting in front of the application that also exists in a separate WAF instance.

Another example list relates to Foreign Domain security widget. The foreign domain security widget can involve the creation of two lists to better filter detected domains and produce both meaningful enforcement and notification.

| Type | List |
|---|---|
| Whitelist | TrustedDomains List of valid domains that can be expected to be embedded in the HTTP request QueryString name/value pairs Body name/value pairs HTTP Headers |
| Known Tools | TestingToolDomains List of invalid domains that can be expected to be embedded in the HTTP request QueryString name/value pairs Body name/value pairs HTTP Headers These domains are commonly leveraged by known security tools and cannot be actioned upon e.g. RSA shutdown |

In some embodiments, security widgets implement an exception list. The exception list allows for the identification of application or application component that should be exempted from the security widget. The table below provide a breakdown of the lists that can support the built-in security widgets

| Implementation |
|---|
| ExceptionAbusiveSession |
| ExceptionEmbeddedDomain |
| ExceptionSQLi |
| ExceptionXSS |
| ExceptionLDAP |
| ExceptionXPath |
| Exception404 |
| ExceptionDirectoryBrowsing |
| RemovableHeaders |
| ExceptionCookies |
| ExceptionCORS |
| ExceptionClickJacking |
| ExceptionCacheControl |

Figure 7:
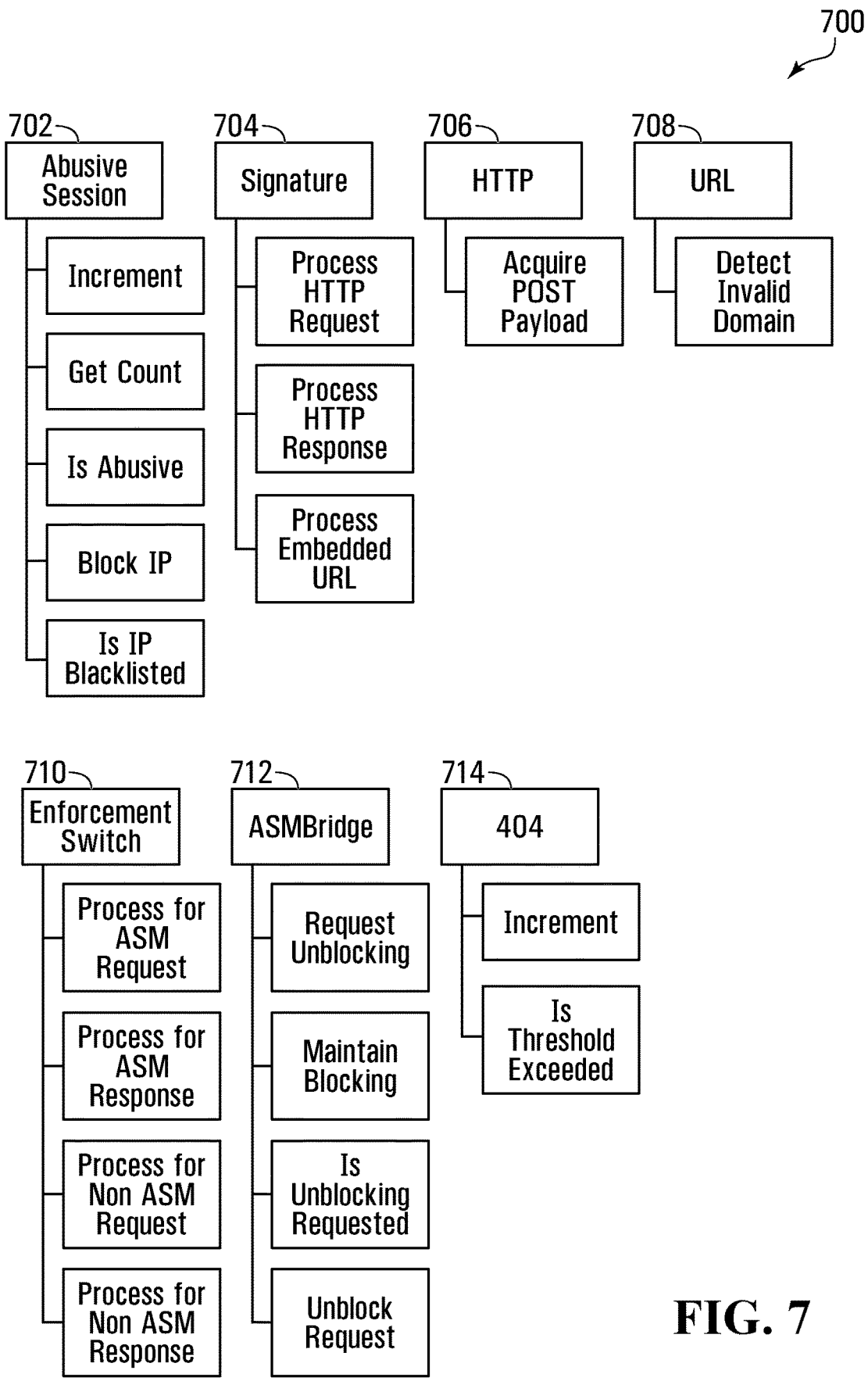
FIG. 7 is a diagram of an application programming interface for malicious request handling according to some embodiments.
Figure 8:
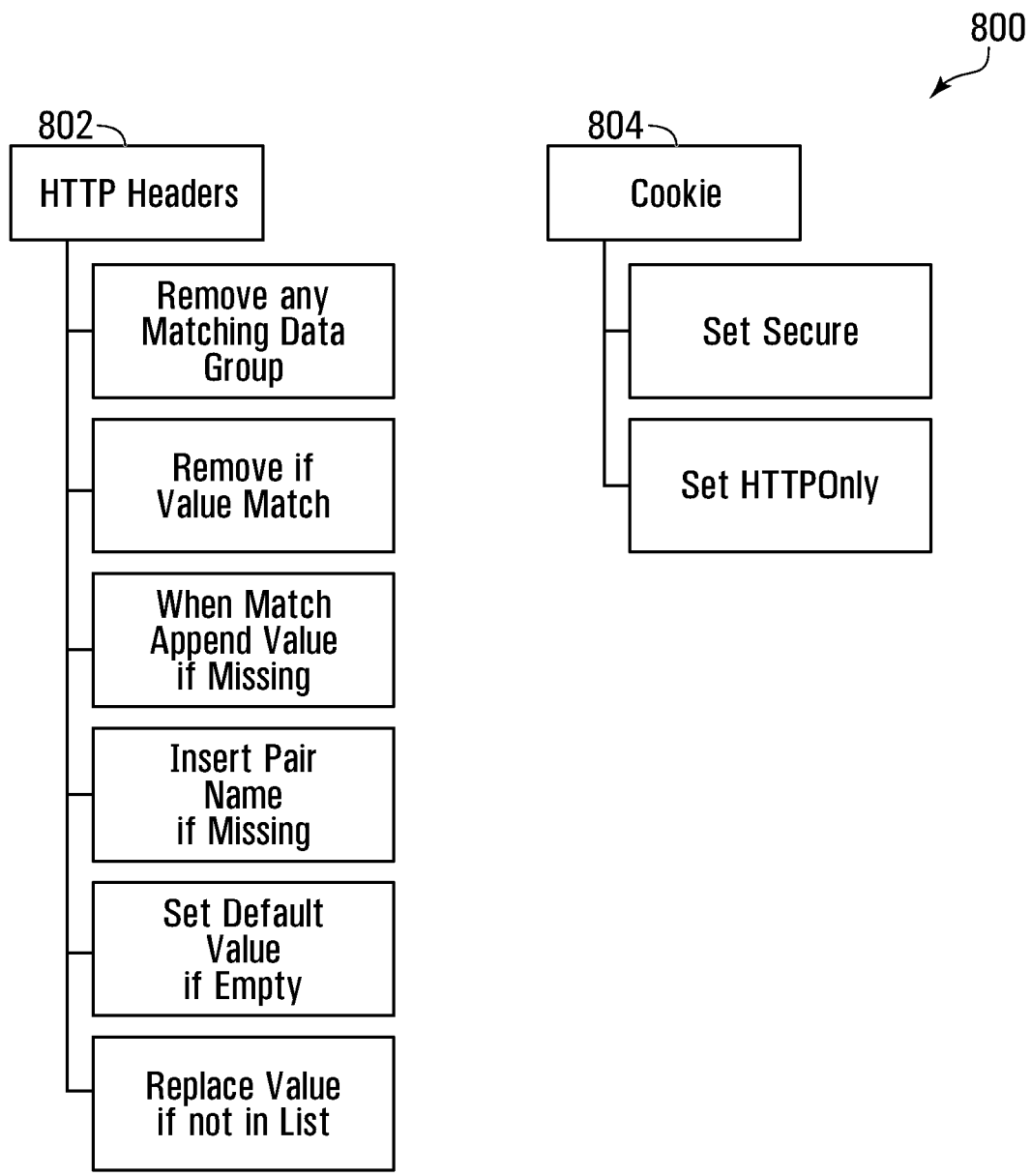
FIG. 8 is a diagram of an application programming interface for application vulnerability patching according to some embodiments.
Figure 9:
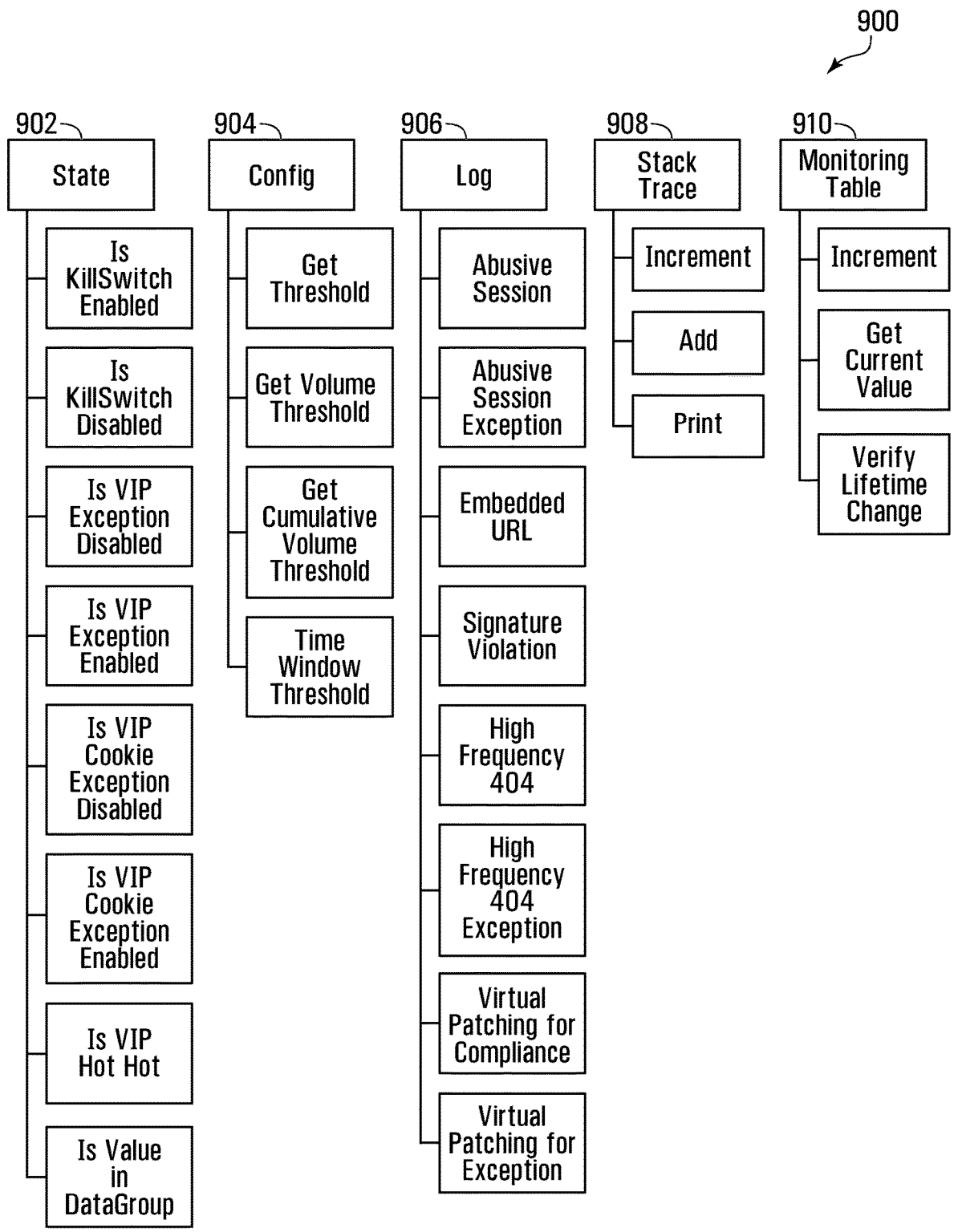
FIG. 9 is a diagram of an application programming interface for framework support according to some embodiments.

In some embodiments, firewall system 100 provides a development API 214 to generate and configure widgets. The API 214 provides an abstraction layer to the underlying security product and is designed to facilitate future updates. For example the API 214 can be developed with iRules and make use of TCL language. FIGS. 7, 8, and 9 provide hierarchical diagrams that describe the API virtual objects and associated methods.

FIG. 7 is an example API 214 hierarchical diagram 700 for malicious request handling according to some embodiments. The API 214 includes virtual objects and methods for malicious request handling. The API 214 defines virtual objects including an abusive session object 702, a signature object 704, HTTPS object 706, URL object 708, enforcement switch object 710, ASM bridge object 712, and 404 object 714. Each virtual object includes one or more associated methods. For example, the abusive session object 702 can include an increment method, get account method, is abusive method, block IP method, is IP blacklisted method, and so on. As another example, the signature object 704 can include a process HTTP request method, process HTTP response method, process embedded URL method, and so on. As another example, the HTTPS object 706 can include an acquire POST method. The URL object 708 can include a detect invalid domain method. The enforcement switch object 710 can include a process for ASM request method, process for ASM response method, process for non-ASM request method, process for non-ASM response method, and so on. The ASM bridge object 712 can include a request unblocking method, a maintain block and method, is unblocking requested method, unblock request method, and so on. The 404 object 714 can include an increment method, is threshold exceeded method, and so on.

FIG. 8 is an example API 214 hierarchical diagram 800 for application vulnerability patching according to some embodiments. The API 214 includes virtual objects and methods for application vulnerability patching. The API 214 defines virtual objects including HDP headers objects 802 and cookies objects 804. The HDP headers objects 802 can include a remove any method, remove if value match method, when match a pen value if method, insert pair if method, set default empty method, replace value not in method, and so on. The cookies objects 804 can include a set secure method, set HTTPOnly method, and so on.

FIG. 9 is an example API 214 hierarchical diagram 900 for framework support according to some embodiments. The API 214 includes virtual objects and methods for framework support. The API 214 includes virtual objects such as state objects 902, configuration objects 904, log objects 906, stack trace objects 908, and monitoring table objects 910. The state objects 902 can include is kill switch enabled method, is kill switch disabled method, is exception disabled method, is exception enabled method, is cookie exception disabled method, is cookie exception enabled method, is hot hot method, is value in method, and so on. The configuration objects 904 can include a get threshold method, a get volume method, a get cumulative volume threshold, time window threshold, and so on. The log objects 906 can include abusive session method, abusive session exception method, embedded URL method, signature by method, high-frequency method, high-frequency exception method, virtual for noncompliance method, virtual method, and so on. The stack trace objects 908 can include a reset method, add method, print method, and so on. The monitoring table objects 910 can include an increment method, get current a method, verify lifetime change method, and so on.

As noted, the API 214 includes virtual objects and methods for malicious request handling or abusive session objects 702. The Abusive Session object 702 is responsible for tracking malicious activity in a pre-determined time window for a given IP and determining when an IP should be blocked.

| Object | Functions | Description |
| --- | --- | --- |
| Abusive Session | Increment | Increments the count of malicious request received for a given IP |
| | GetCount | Returns the current count of malicious request received for a given IP |
| | IsAbusive | Returns a Boolean value indicating whether the count of malicious request received for a given IP in the pre-determined time window has exceeded a threshold |
| | BlockIP | Sets a flag to indicate that traffic from a given IP should be blocked |
| | IsIPBlacklisted | Returns a Boolean value indicating whether a given IP is blocked or not |

As noted, the API 214 includes virtual objects and methods for signature objects 704. The Signature object is responsible for handling the outcome of detecting a signature based violation the following examples: Standard signature—HTTP Request; Standard signature—HTTP Response; and Custom signature—HTTP Request.

| Object | Functions | Description |
| --- | --- | --- |
| Signature | ProcessHTTPRequest | Generic function to process HTTP Request based signature detection. The function encompasses all the required logic to handle: Security widget switches; Integration with the abusive session security widget; Cumulative and Mandatory Signature set requirements; Framework logging requirements. |
| | ProcessHTTPResponse | Generic function to process HTTP Response based signature detection. The function encompasses all the required logic to handle: Security widget switches; Integration with the abusive session security widget; Cumulative signature set requirements; Framework logging requirements. |
| | ProcessEmbeddedURL | Processes foreign domain detection in HTTP request parameters. The function encompasses all the required logic to handle: Security widget switches; Integration with the abusive session security widget; Framework logging requirements. |

As noted, the API 214 includes virtual objects and methods for HTTP objects 706. The HTTP object is responsible for handling complex and/or untypical HTTP manipulation.

| Object | Functions | Description |
| --- | --- | --- |
| HTTP | AcquirePOSTPayload | Handles the collection of the HTTP Post body content |

As noted, the API 214 includes virtual objects and methods for URL objects 708. The URL object is responsible for handling URL based violation detection.

| Object | Functions | Description |
| --- | --- | --- |
| URL | DetectInvalidDomain | Returns the first non-whitelisted domain found in the supplied string |

As noted, the API 214 includes virtual objects and methods for enforcement switch objects 710. The Enforcement Switch object is responsible for handling both enforcement and network block switches according to the underlying detection regulation (product based or custom).

| Object | Functions | Description |
|---|---|---|
| Enforcement Switch | ProcessForASMRequest | Processes the security widget enforcement and network block switches for an HTTP Request based detection regulated through the F5 ASM |
| | ProcessForASMResponse | Processes the security widget enforcement and network block switches for an HTTP Response based detection regulated through the F5 ASM |
| | ProcessForNonASMRequest | Processes the security widget enforcement and network block switches for an HTTP Request based detection manually regulated |
| | ProcessForNonASMResponse | Processes the security widget enforcement and network block switches for an HTTP Response based detection manually regulated |

As noted, the API 214 includes virtual objects and methods for ASM bridge objects 712. The ASM Bridge object is responsible for controlling the underlying security product in regard to blocking/unblocking a request.

| Object | Functions | Description |
|---|---|---|
| ASM Bridge | RequestUnblocking | Maintains a flag to keep track of unblocking request sent by security widgets e.g. When the kill switch is enabled When the application or application component is exempted |
| | MaintainBlocking | Sets a flag to indicate that the HTTP request should be blocked regardless of other security widget's flag setting |
| | IsUnblockingRequested | Returns a Boolean value indicating whether there has been a request to unblock the HTTP request |
| | UnblockRequest | Removes the block on an HTTP request |

As noted, the API 214 includes virtual objects and methods for 404 objects 714. The 404 object is responsible for tracking discovery activity associated to resource name guessing.

| Object | Functions | Description |
|---|---|---|
| 404 | Increment | Increments the number of discovery request received for a given IP |
| | IsThresholdExceeded | Returns a Boolean value indicating whether the number of discovery request received for a given IP in the pre-determined time window has exceeded a threshold |

Embodiments described herein provide an API 214 was functions for Application Vulnerability Patching such as the examples shown in FIG. 8. The functions for application vulnerability patching can implement the logic to handle the enforcement and network block switches. The HTTP Headers object 802 is responsible for providing simple and direct means to validate and/or update HTTP headers and their various implementation e.g. Single value; Embedded name/value pairs; and Delimited multiple values.

| Object | Functions | Description |
|---|---|---|
| HTTP Headers | RemoveAnyMatchingDataGroup | Generic function to remove any headers in the HTTP Response matching a pre-defined list. |
| | RemoveIfValueMatch | Generic function to remove a header in the HTTP Response if the value is a match. |
| | WhenMatchAppendValueIfMissing | Generic function to perform header patching: Detection Determine if the header of interest contains a given value If true, determine if a second given value is missing Patching Append a second given value to a header using the supplied delimiter |
| | InsertPairNameIfMissing | Generic function to perform header patching: Detection Determine if the header of interest contains a given pair name Patching Append the name/value pair if pair name is missing |
| | SetDefaultValueIfEmpty | Generic function to perform header patching: Detection Determine if the header of interest is empty or does not exist Patching Set the header with a given value if missing |
| | ReplaceValueIfNotInList | Generic function to perform header patching: Detection Determine if the header of interest contains a given value available in a pre-determined list Patching Replace value with a second given value if not in the list |

The Cookie object 804 is responsible for streamlining the process of maintaining security based cookie attributes.

| Object | Functions | Description |
|---|---|---|
| Cookie | SetSecure | Adds the "Secure" attribute to a cookie if the traffic is over SSL and attribute is missing. |
| | SetHTTPOnly | Adds the "HTTPOnly" attribute to a cookie if the attribute is missing. |

The API 214 provides framework support such as the example shown in FIG. 9. The State object 902 is responsible for providing streamlined access to switches and exception list affecting the framework workflow.

| Object | Functions | Description |
|---|---|---|
| State | IsKillSwitchEnabled | Returns a Boolean value indicating if a security widget kill switch is enabled |

-continued

| Object | Functions | Description |
|---|---|---|
| | IsKillSwitchDisabled | Returns a Boolean value indicating if a security widget kill switch is disabled |
| | IsVIPExceptionDisabled | Returns a Boolean value indicating if an application exemption is disabled |
| | IsVIPExceptionEnabled | Returns a Boolean value indicating if an application exemption is enabled |
| | IsVIPCookieExceptionDisabled | Returns a Boolean value indicating if an application component exemption is disabled |
| | IsVIPCookieExceptionEnabled | Returns a Boolean value indicating if an application component exemption is enabled |
| | IsVIPHotHot | Returns a Boolean value indicating if an application is deployed with a Hot-Hot WAF |
| | IsValueInDataGroup | Returns a Boolean value indicating if a value exist in a given DataGroup |

The Config object 904 is responsible for providing streamlined access to the configurable thresholds affecting the framework workflow.

| Object | Functions | Description |
|---|---|---|
| Config | GetThreshold | Generic function that returns the value set for a given threshold and the application WAF deployment |
| | GetVolumeThreshold | Returns the value set for a given volume threshold |
| | GetCumulativeVolumeThreshold | Returns the value set for a given cumulative volume threshold |
| | TimeWindowThreshold | Returns the value set for a given time window threshold |

The Log object 906 is responsible for providing streamlined access to the underlying security product logging functionality.

| Object | Functions | Description |
|---|---|---|
| Log | AbusiveSession | Standardized and centralized logging for an Abusive Session violation |
| | AbusiveSessionException | Standardized and centralized logging for an Abusive Session violation exception |
| | EmbeddedURL | Standardized and centralized logging for an foreign domain embedded URL violation |
| | SignatureViolation | Standardized and centralized logging for standard signature based violation |
| | HighFrequency404 | Standardized and centralized logging for high frequency of HTTP response 404 |
| | HighFrequency404Exception | Standardized and centralized logging |

-continued

| Object | Functions | Description |
|---|---|---|
| | | for high frequency of HTTP response 404 exception |
| | VirtualPatchingForNonCompliance | Standardized and centralized logging for application virtual patching |
| | VirtualPatchingForException | Standardized and centralized logging for application virtual patching exception |

The Stack Trace object 908 is responsible for providing a customizable reporting on workflow and the various security events firing.

| Object | Functions | Description |
|---|---|---|
| Stack Trace | Reset | Reset stack trace for an IP |
| | Add | Add entry in the stack trace for an IP |
| | Print | Log stack trace for an IP |

The Monitor Table object 910 is responsible for monitoring and maintaining a variety of key security attributes that support the security widgets

| Object | Functions | Description |
|---|---|---|
| Monitoring Table | Increment | Generic function to track the number of instances for a given security attribute |
| | GetCurrentValue | Returns the current count for a given security attribute |
| | VerifyLifetimeChange | Validates if the configured lifetime of the data element being monitored has changed. In the event of a change, the clock is reset |

Figure 10:
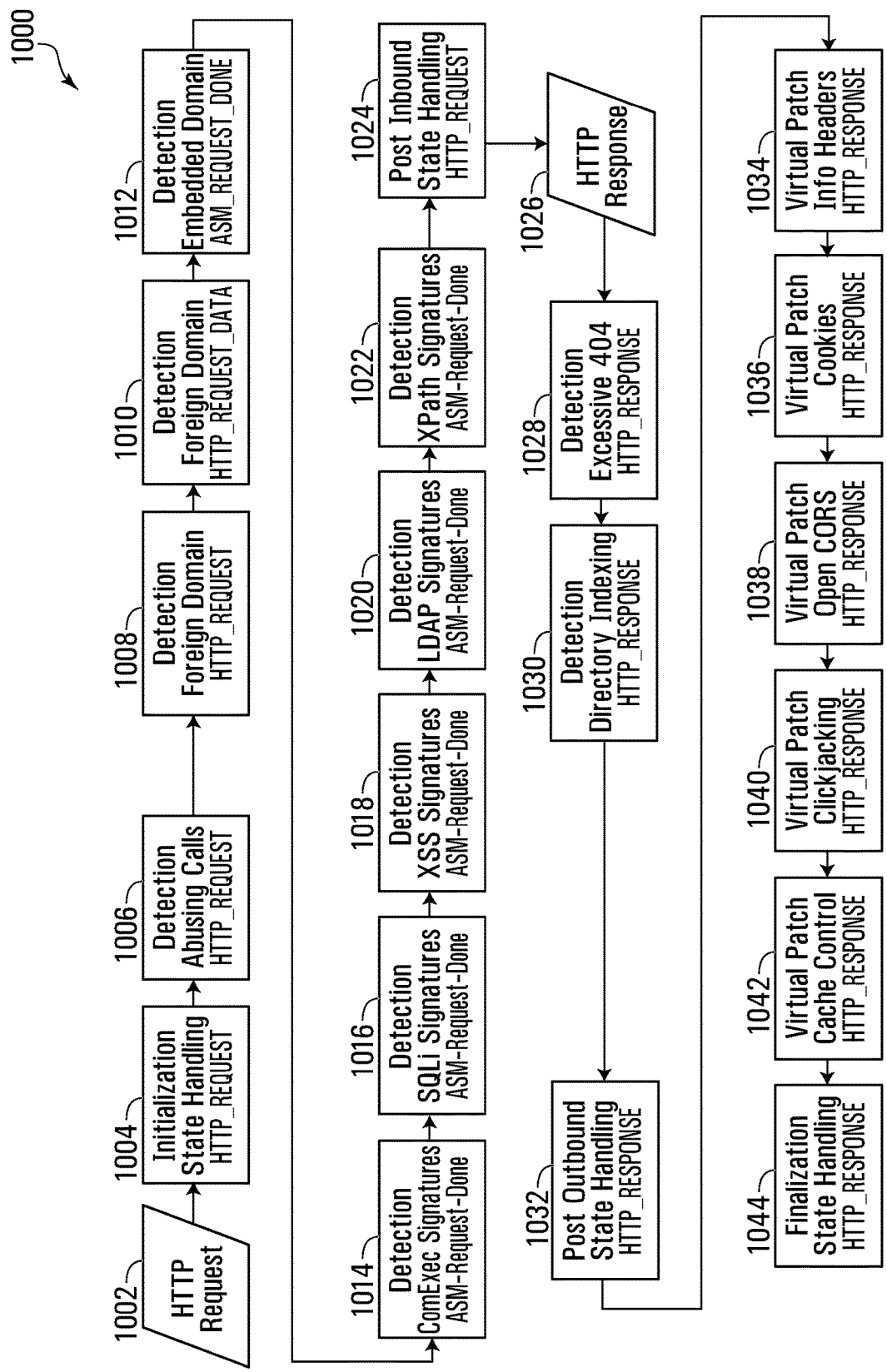
FIG. 10 is a diagram of a security stack process according to some embodiments.

FIG. 10 is a diagram of a security stack process 1000 according to some embodiments. At 1002, the security stack receives an HTTP request from the web application. At 1004, the security stack initializes state handling in response to the request. At 1006, the security stack implements detection abusing calls. At 1008, 1010, the security stack implements detection foreign domain processing for the HTTP request and the request data. At 1012, the security stack implements detection embedded domain processing for the ASM request. At 1014, the security stack implements detection signature processing for COM EXEC signatures of the ASM request. At 1016, the security stack implements detection signature processing for SQL signatures of the ASM request. At 1018, the security stack implements detection signature processing for XSS signatures of the ASM request. At 1020, the security stack implements detection signature processing for LDAP signatures of the ASM request. At 1022, the security stack implements detection signature processing for XPATH signatures of the ASM request. At 1024, the security stack implements post inbound state handling. At 1026, the security stack receives an HTTP response. At 1028, the security stack implements detection excessive 404 processing for the HTTP response. At 1030, the security stack implements detection directory indexing. At 1032, the security stack implements post outbound state handling. At 1034, 1036, 1038, 1040, 1042, the security stack implements virtual patch processing including info headers, cookies, open CORS, clickjacking, cache control, and so on. At 1044, the security stack finalizes state handling.

Figure 11:
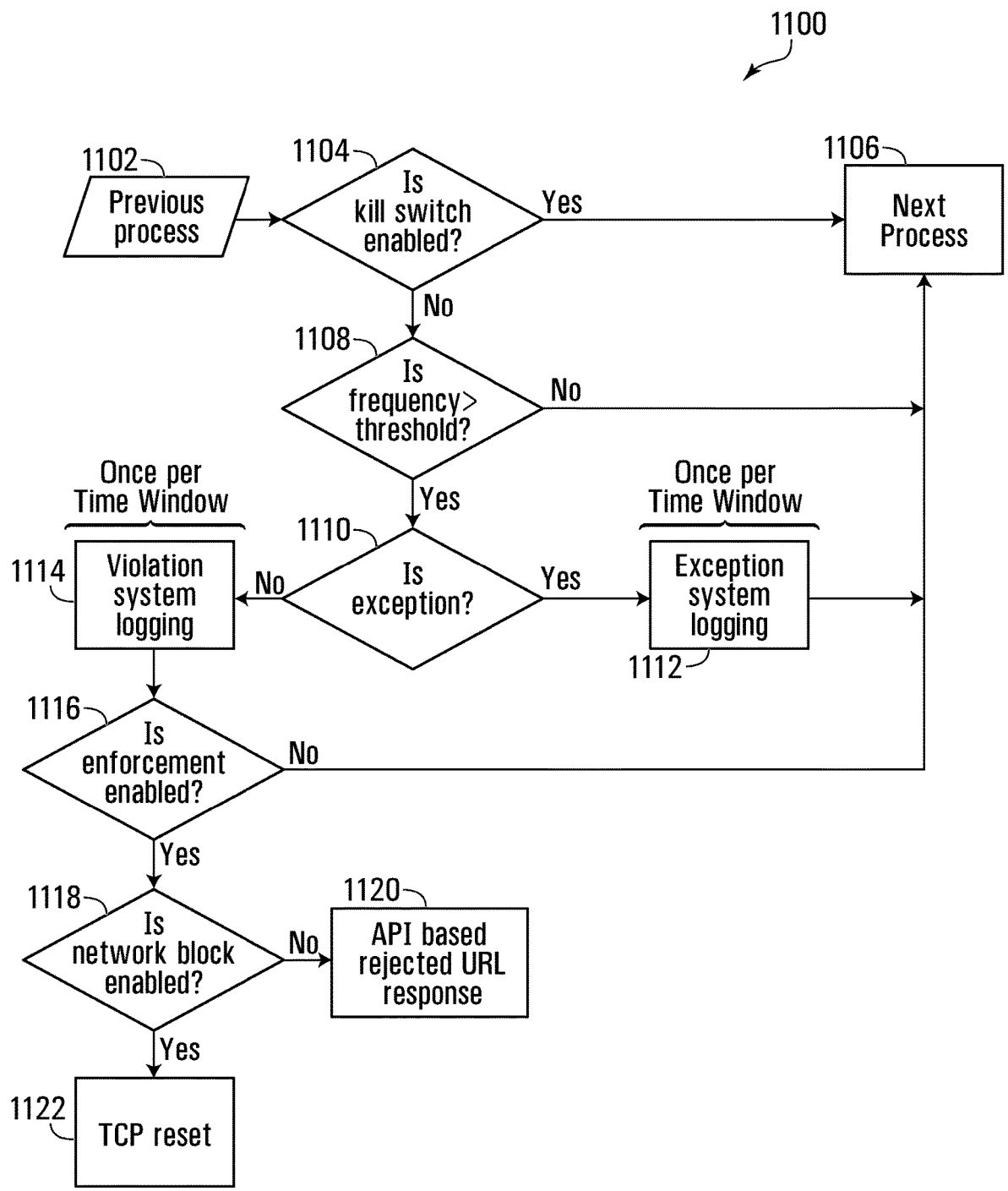
FIG. 11 is a diagram of a security stack process for abusive session detection according to some embodiments.

FIG. 11 is a diagram of a security stack process 1100 for abusive session detection according to some embodiments. The process 1100 starts at 1102 from a previous process for the firewall. At 1104, the abusive session involves a determination of whether a kill switch is enabled. If not, at 1108, the session determines whether this frequency is above a predetermined threshold. If so, at 1110, the process logic code determines whether an exception is enabled. If the exception is enabled, at 1112, the process logic code implements exception system logging. If the exception is not enabled, at 1114, the process implements violation system logging. At 1116, the process determines whether enforcement is enabled. If so, at 1118, the process logic code determines whether the network lock is enabled. If so, 1122, the process logic code implements a TCP reset. If not, at 1120, the process implements an API based rejected response. If the kill switch is enabled (1104) or the frequency is below the threshold (1108), at 1106, the process 1100 moves to the next process for the firewall.

Figure 12A:
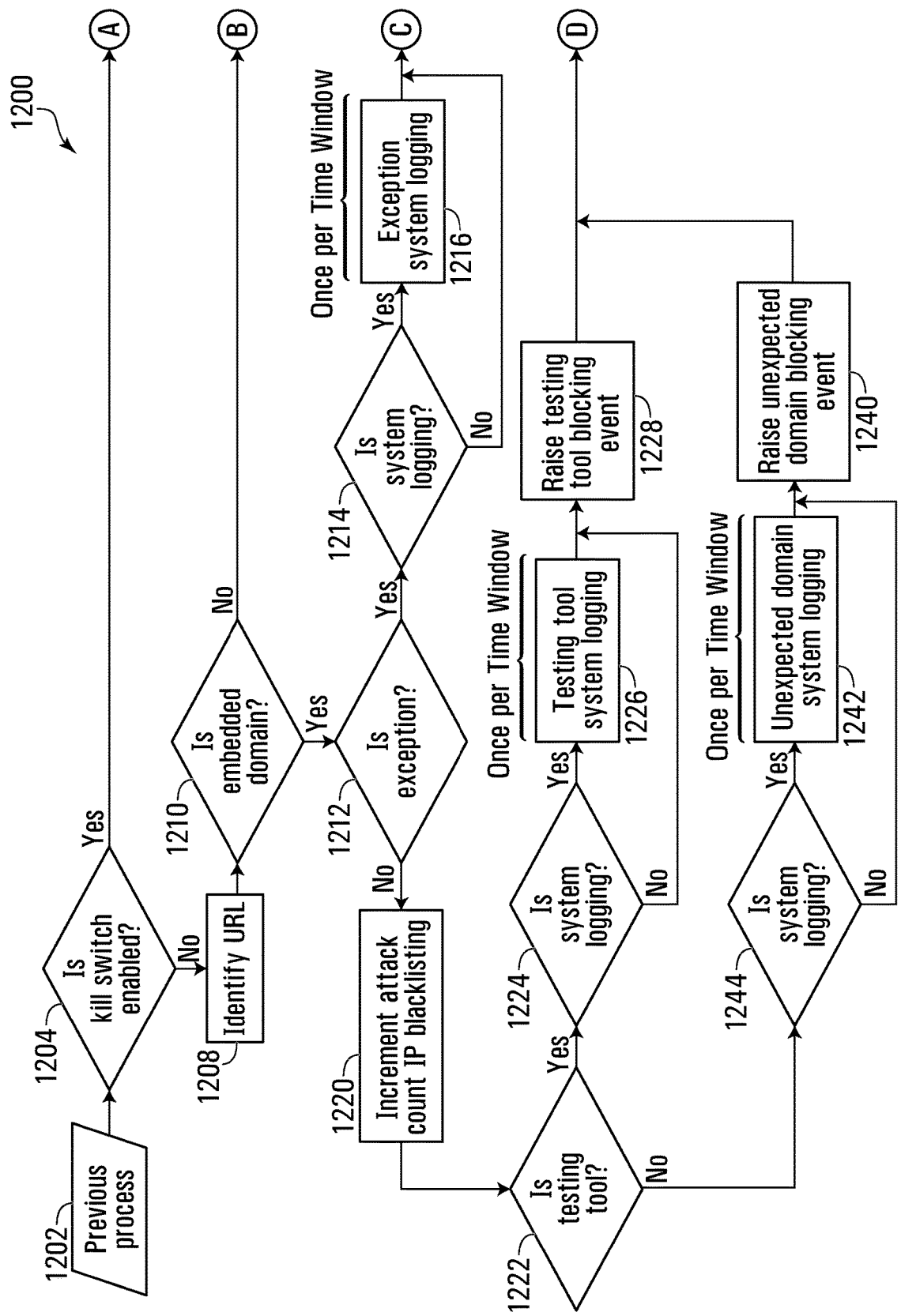
FIGS. 12A and 12B are diagrams of a security stack process for embedded domain detection according to some embodiments.
Figure 12B:
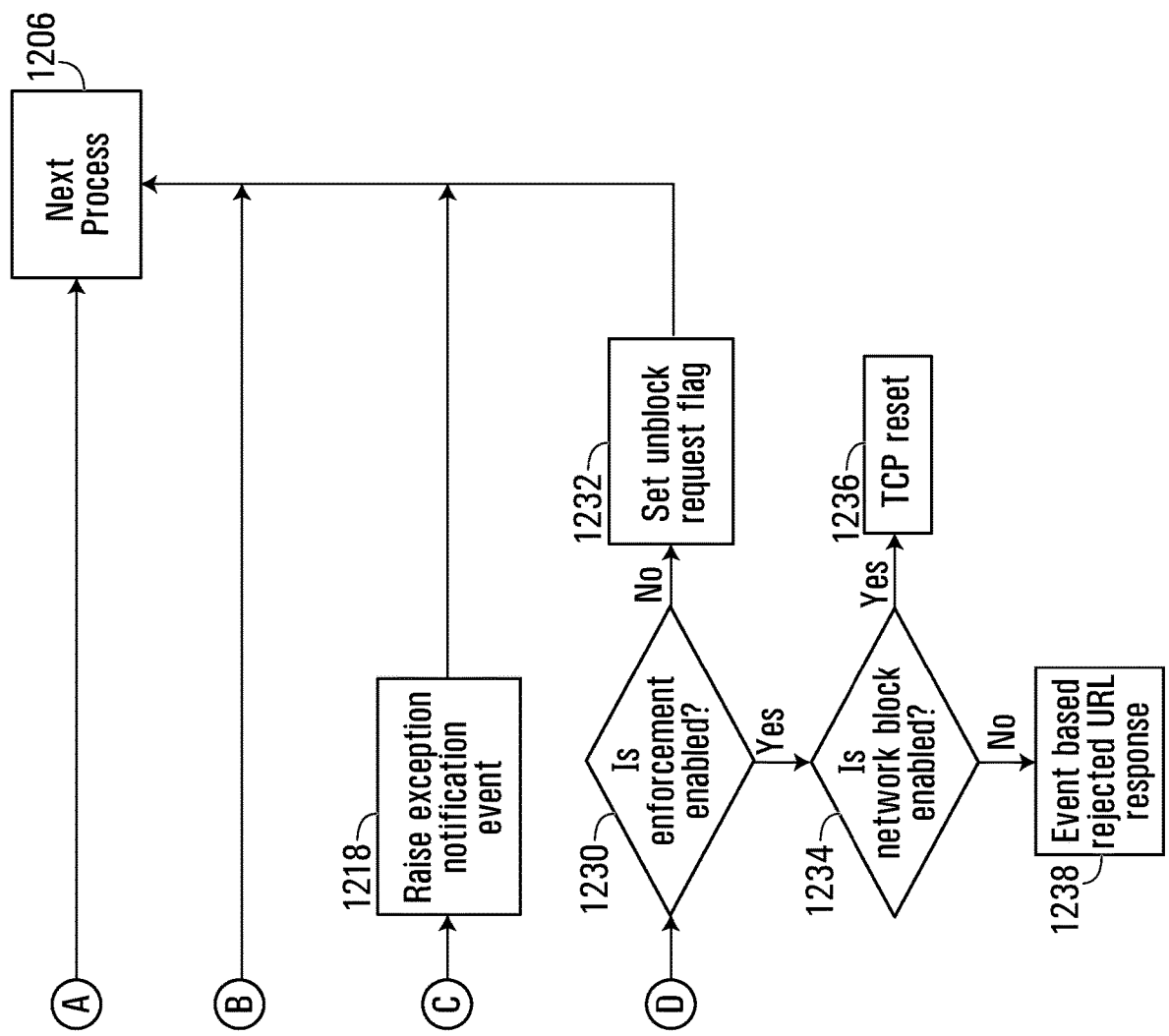

FIGS. 12A and 12B are diagrams of a security stack process 1200 for embedded domain detection according to some embodiments. The process 1200 starts at 1202 from a previous process for the firewall. At 1204, the process logic code determines whether the kill switch is enabled. If not, at 1208, the process logic code identifies a URL and, at 1210, determines whether it is an embedded domain. If so, at 1212, the process logic code determines whether it is an exception. If it is an exception, at 1214, the process logic code determines if the firewall system is logging. If so, at 1216, the process logic code implements exception system logging. At 1218, the process logic code raises an exception notification event. If it is not an exception, at 1220, the process logic code implements an increment attack count for IP blacklisting. At 1222, the process logic code determines whether it is a testing tool. At 1224, the process logic code determines if the firewall system is logging. At 1226, the process logic code implements testing tool system logging. At 1228, the process logic code raises a testing tool blocking event. At 1230, the process logic code determines if enforcement is enabled. At 1232, the process logic code sets an unblock request flag. If enforcement is enabled, at 1234, the process logic code determines if the network block is enabled. At 1236, the process logic code implements a TCP reset. At 1238, the process logic code implements an event based rejected URL response. If the process logic code determines that it is not a testing tool, at 1244, the process logic code determines if the firewall system is logging. At 1242, the process logic code implements unexpected domain system logging. At 1240, the process logic code raises an unexpected domain blocking event. At 1206, the process 1200 moves to the next process for the firewall.

Figure 13A:
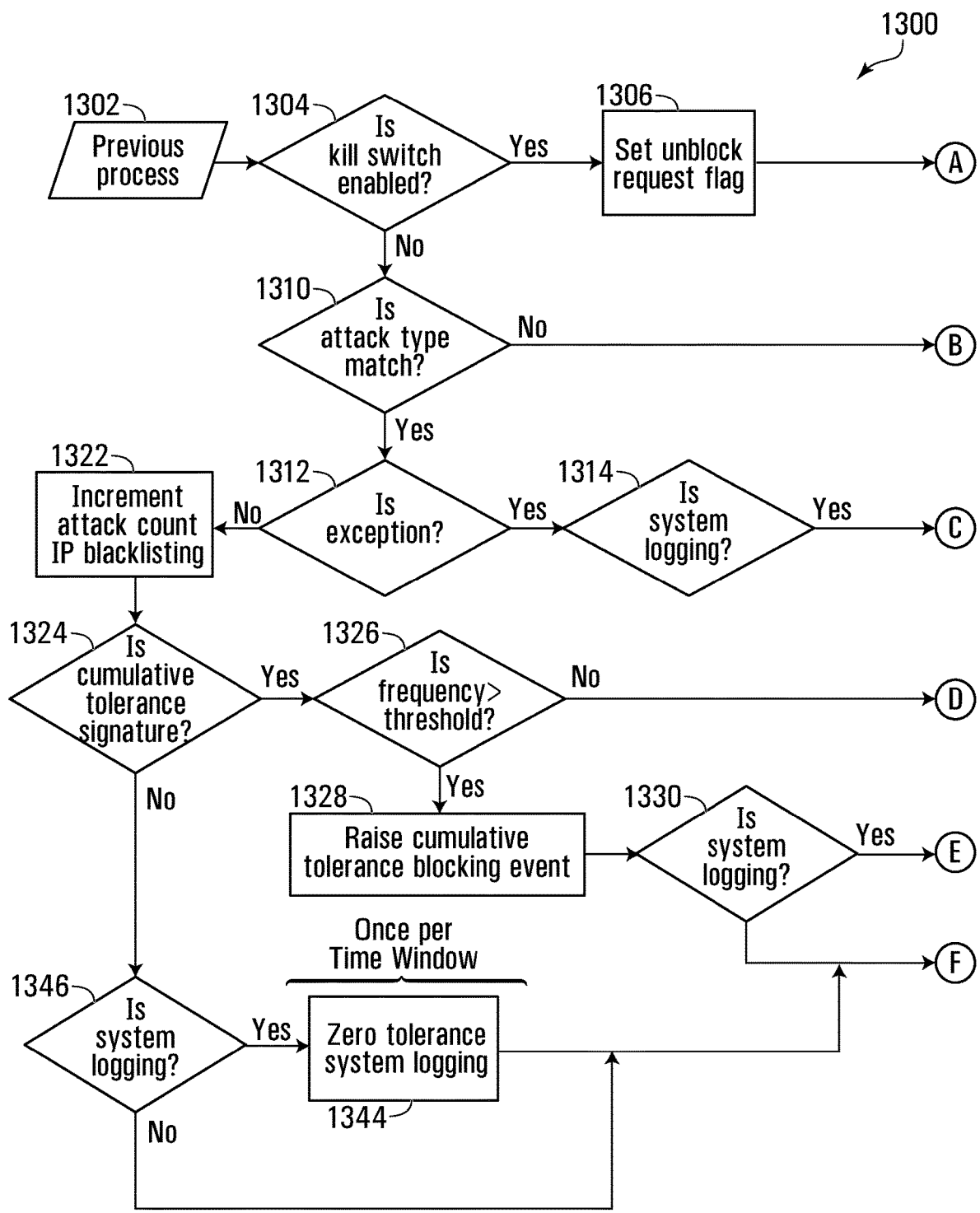
FIGS. 13A and 13B are diagrams of a security stack process for standard signature detection according to some embodiments.
Figure 13B:
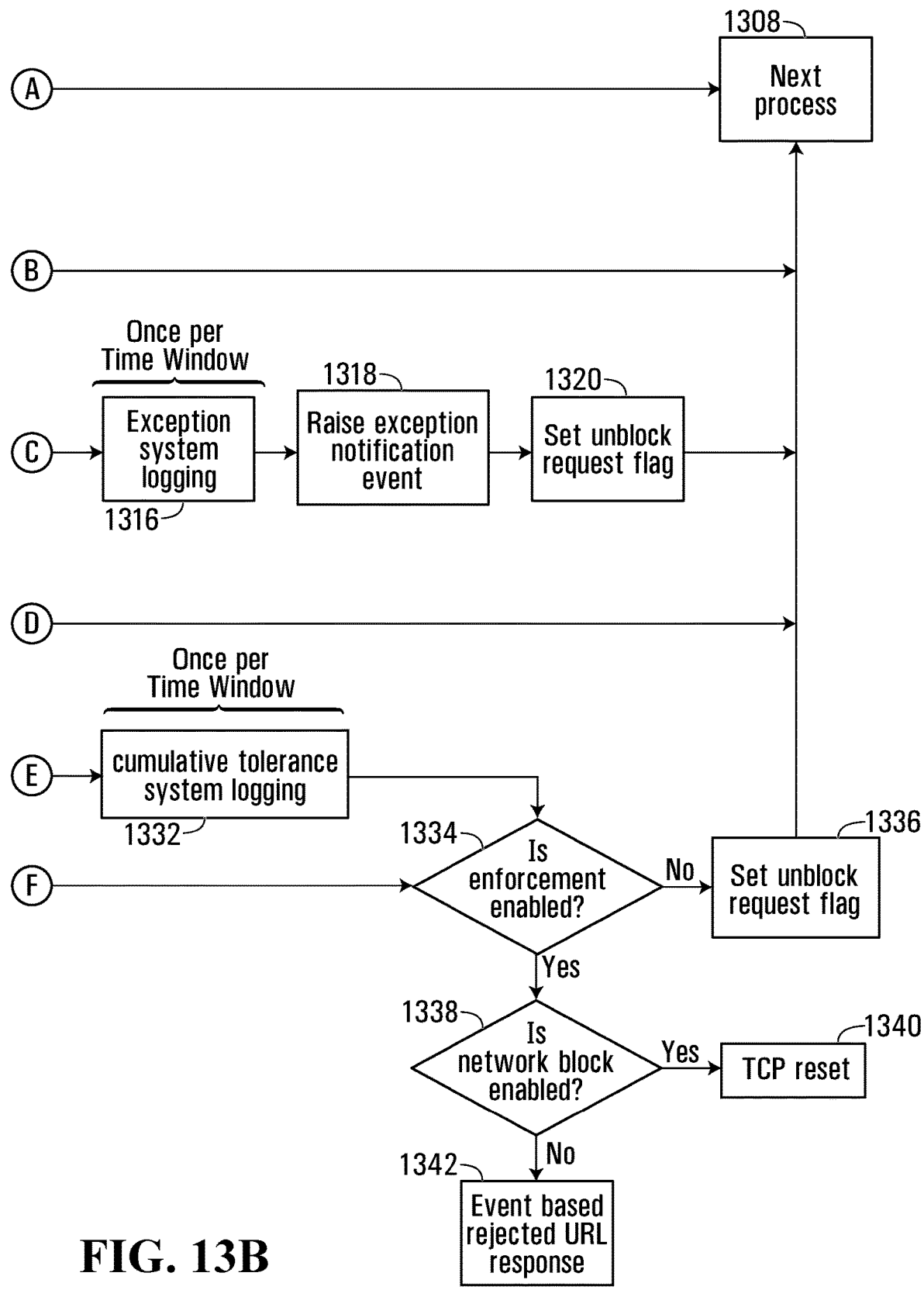

FIGS. 13A and 13B are diagrams of a security stack process 1300 for standard signature detection according to some embodiments. The process 1300 starts at 1302 from a previous process for the firewall. At 1304, the process logic code determines whether the kill switch is enabled. If the kill switch is enabled, at 1306, the process logic code sets the unblock request flag. If not, at 1310, the process logic code determines whether there is an attack type match. At 1312, the process logic code determines whether there is an exception. If so, at 1314, the process logic code determines whether the firewall system is logging. At 1316, the process logic code implements exception system logging (once per time window). At 1318, the process logic code raises an exception notification event. At 1320, the process logic code sets an unblock request flag.

If it is not an exception, at 1322, the process logic code increments an attack count IP blacklisting. At 1324, the process logic code determines whether there is a cumulative tolerance signature. If there is a cumulative tolerance signature, at 1326, the process logic code determines whether the frequency is over a threshold. If so, at 1328, the process logic code raises the cumulative tolerance blocking event. At 1330, the process logic code determines whether the firewall system is logging. If so, at 1332, the process logic code implements cumulative tolerance system logging (once per time window). At 1334, the process logic code determines whether enforcement is enabled. If not, at 1336, the process logic code sets an unblock request flag. If so, at 1338, the process logic code determines if the network block is enabled. At 1340, the process logic code implements a TCP reset. At 1342, the process logic code implements an event based rejected URL response.

If there is not a cumulative tolerance signature, at 1346, the process logic code determines whether the firewall system is logging. If so, at 1344, the process logic code implements a zero tolerance system logging and proceeds to determine whether enforcement is enabled at 1334. At 1308, the process 1300 moves to the next process for the firewall.

Figure 14:
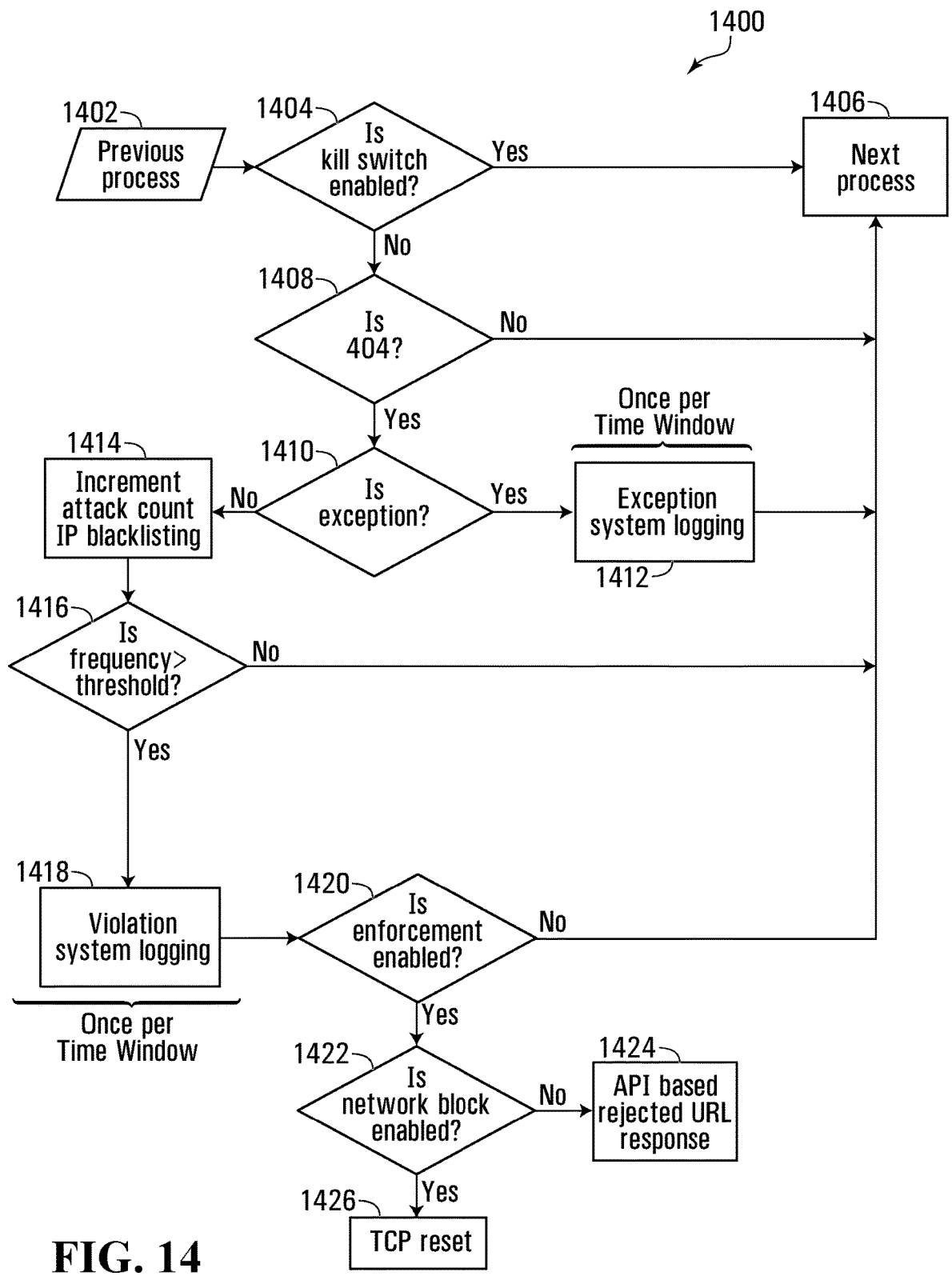
FIG. 14 is a diagram of a security stack process for response code detection according to some embodiments.

FIG. 14 is a diagram of a security stack process 1400 for response code detection according to some embodiments. The process 1400 starts at 1402 from a previous process for the firewall. At 1404, the process logic code determines whether the kill switch is enabled. If not, at 1408, the process logic code determines whether there is a 404 error message (HTTP response code). If so, at 1410, the process logic code determines whether there is an exception. If there is an exception, at 1412, the process logic code implements exception system logging. If there is not an exception, at 1414, the process increments attack count IP blacklisting. At 1416, the process logic code determines if the frequency is greater than a threshold. If so, the process logic code implements violation system logging. At 1420, the process logic code determines if enforcement is enabled. At 1422, the process logic code determines whether the network block is enabled. At 1426, the process logic code implements a TCP reset. At 1424, the process logic code implements an API based rejected URL response. At 1406, the process 1400 moves to the next process for the firewall.

Figure 15:
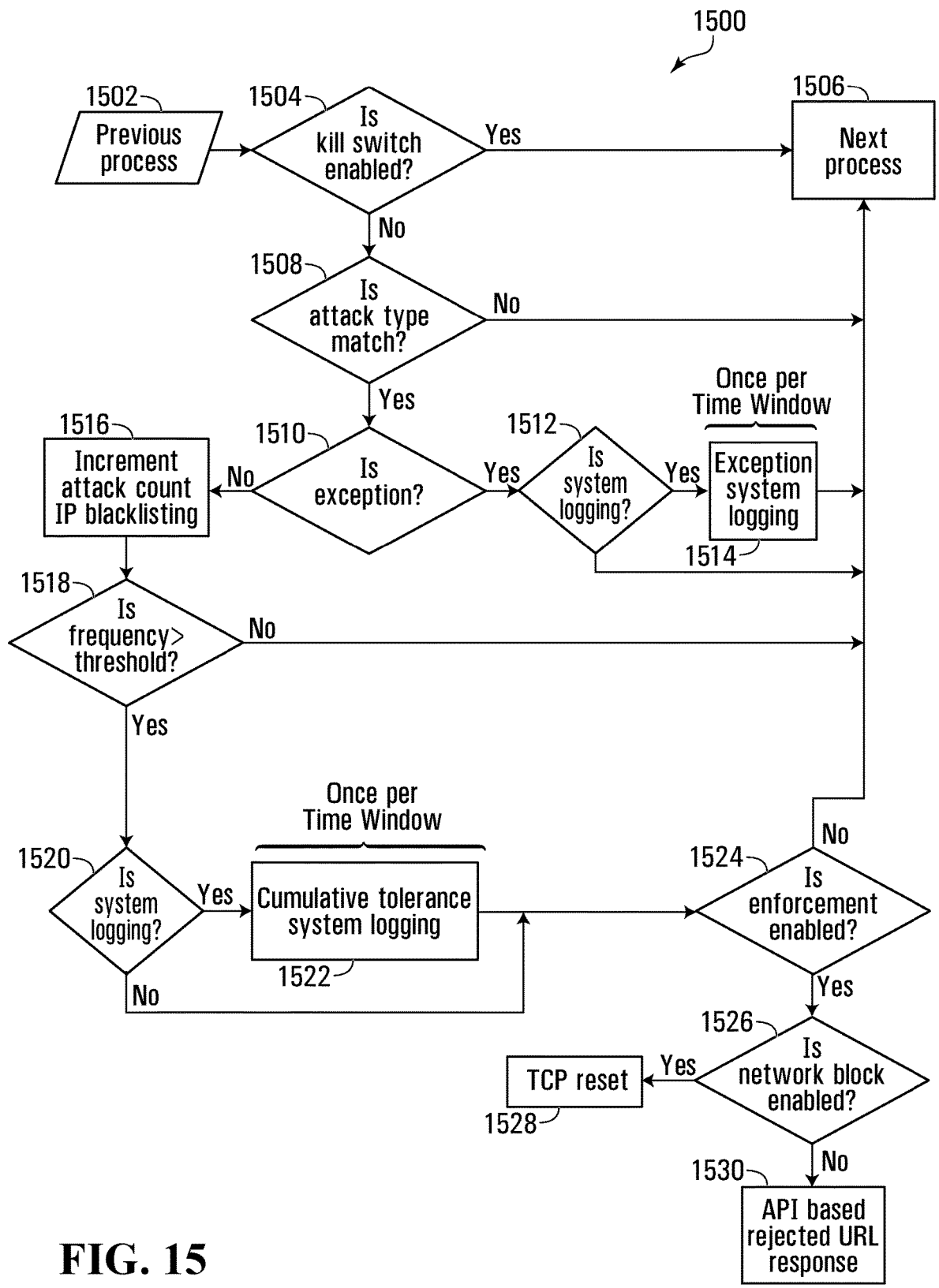
FIG. 15 is a diagram of a security stack process for standard signature detection according to some embodiments.

FIG. 15 is a diagram of a security stack process 1500 for standard signature detection according to some embodiments. The process 1500 starts at 1502 from a previous process for the firewall. At 1504, the process logic code determines whether there is a kill switch enabled. If not, at 1508, the process logic code determines whether there is an attack type match. If so, at 1510, the process logic code determines whether there is an exception. If there is an exception, at 1512, the process logic code determines whether the firewall system is logging. At 1514, the process logic code implements exception system logging. If there is not an exception, at 1516, the process logic code increments attack count IP blacklisting. At 1518, the process logic code determines whether the frequency is greater than a threshold. If so, at 1520, the process logic code determines whether the firewall system is logging. At 1522, the process logic code implements cumulative tolerance system logging. At 1524, the process logic code determines if enforcement is enabled. At 1526, the process logic code determines if the network block is enabled. If the network block is enabled, at 1528, the process logic code implements a TCP reset. If the network block is not enabled, at 1530, the process logic code implements an API based rejected URL response. At 1506, the process 1500 moves to the next process for the firewall.

Figure 16:
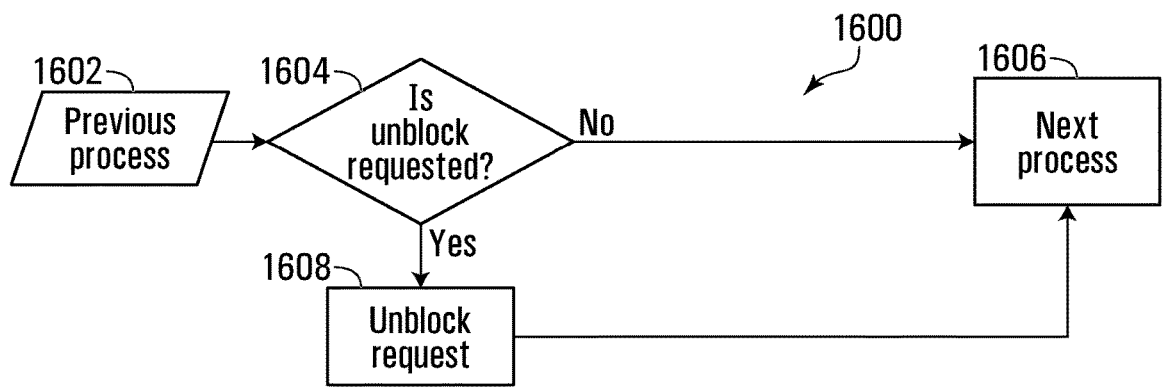
FIG. 16 is a diagram of a security stack process for post inbound request handling according to some embodiments.

FIG. 16 is a diagram of a security stack process 1600 for post inbound request handling according to some embodiments. The process 1600 starts at 1602 from a previous process for the firewall. At 1604, the process logic code determines whether a un-block is requested. If so, at 1608, the process logic code unblocks the request. At 1606, the process 1600 moves to the next process for the firewall.

Figure 17:
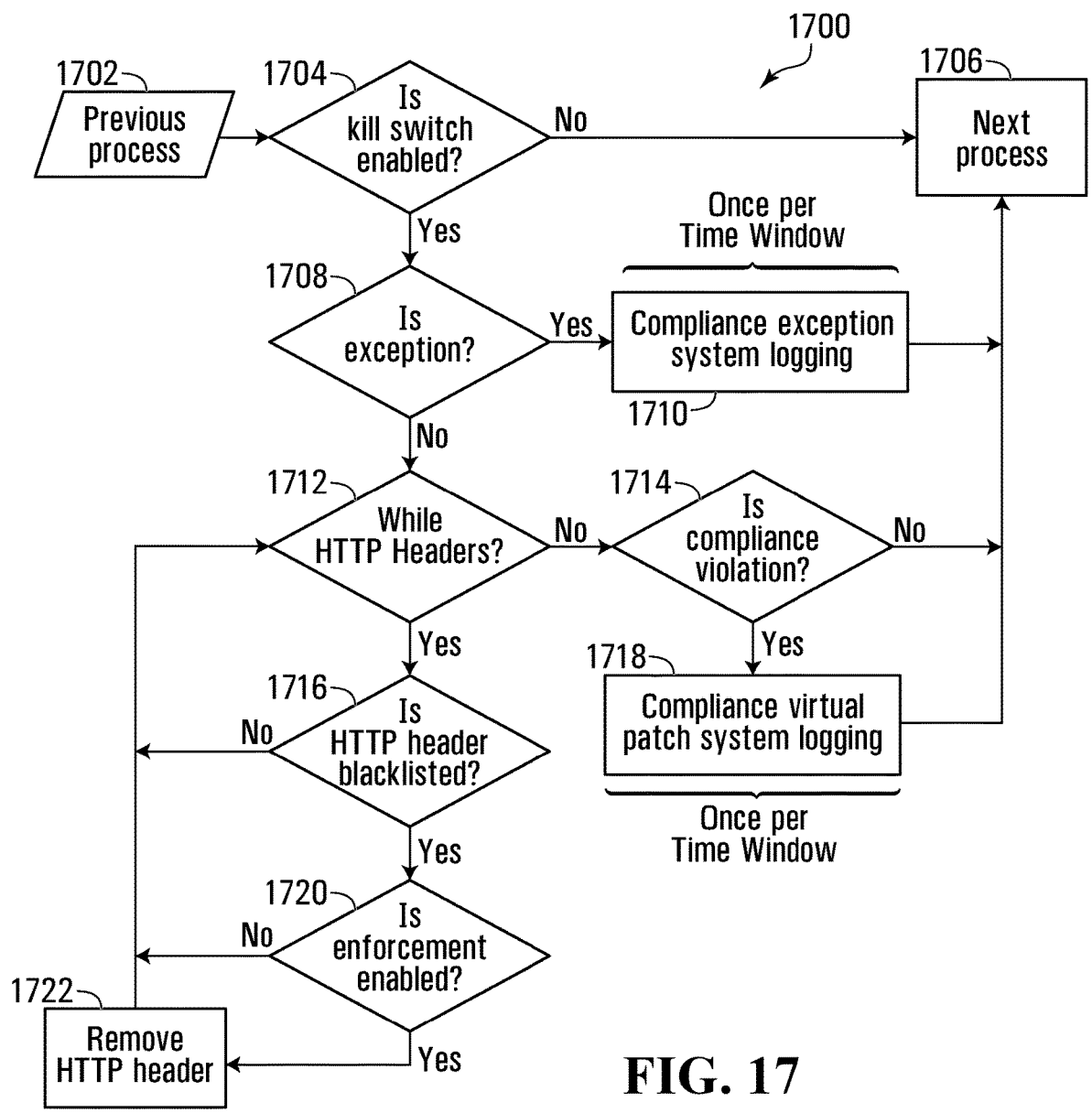
FIG. 17 is a diagram of a security stack process for HTTP headers according to some embodiments.

FIG. 17 is a diagram of a security stack process 1700 for HTTP headers according to some embodiments. The process 1700 starts at 1702 from a previous process for the firewall. At 1704, the process logic code determines whether there is a kill switch enabled. If not, at 1708, the process logic code determines whether there is an exception. If there is an exception, at 1710, the process logic code implements compliance exception system logging. If there is not an exception, at 1712, the process logic code determines whether there are HTTP headers. If not, at 1714, the process logic code determines whether there is a compliance violation. If so, at 1718, the process logic code implements virtual patch system logging. If there are HTTP headers, at 1716, the process logic code determines whether the HTTP headers are blacklisted. If so, at 1720, the process logic code determines whether enforcement is enabled. If so, then at 1722, the process logic code removes the HTTP header. At 1706, the process 1700 moves to the next process for the firewall.

Figure 18A:
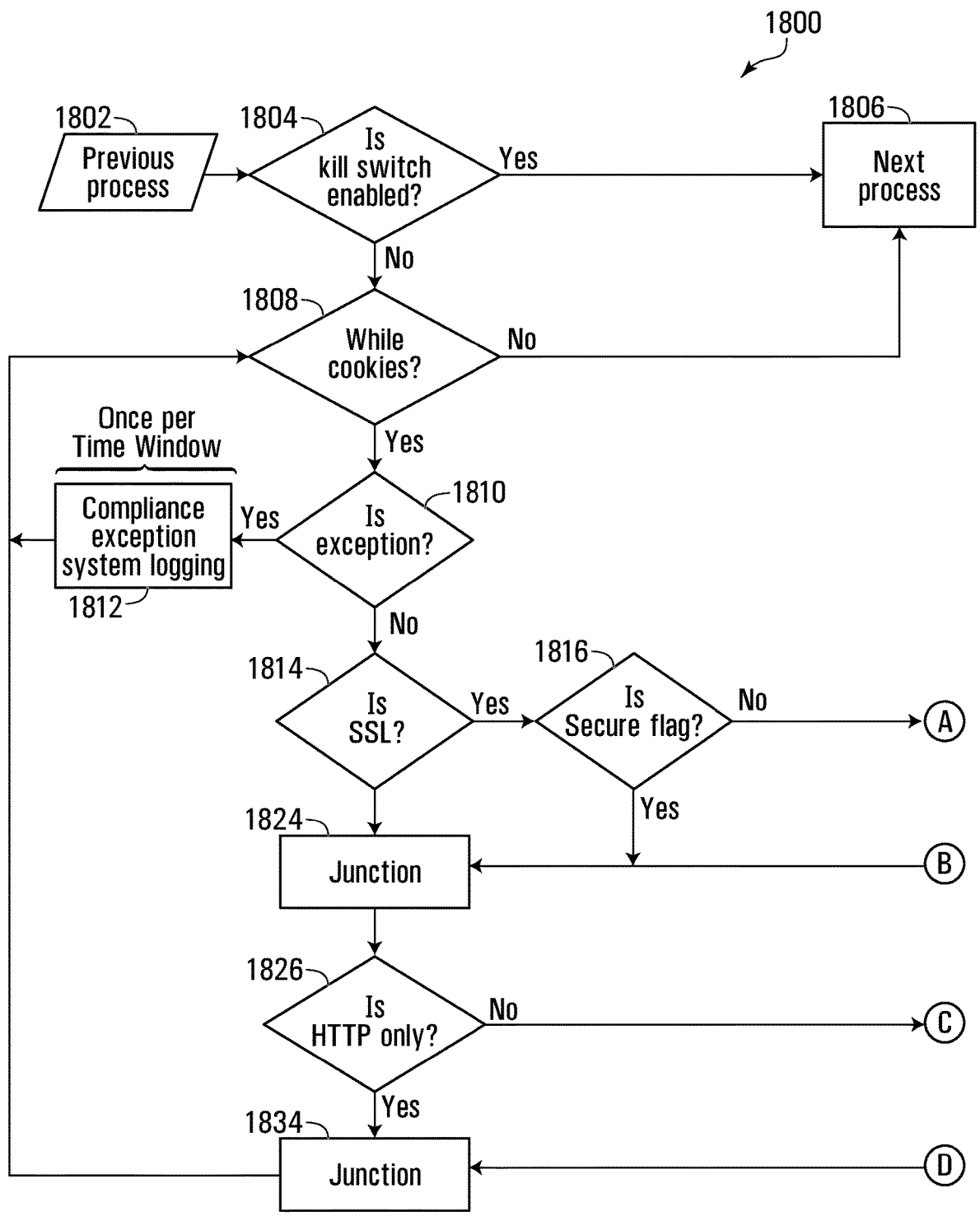
FIGS. 18A and 18B are diagrams of a security stack process for cookies according to some embodiments.
Figure 18B:
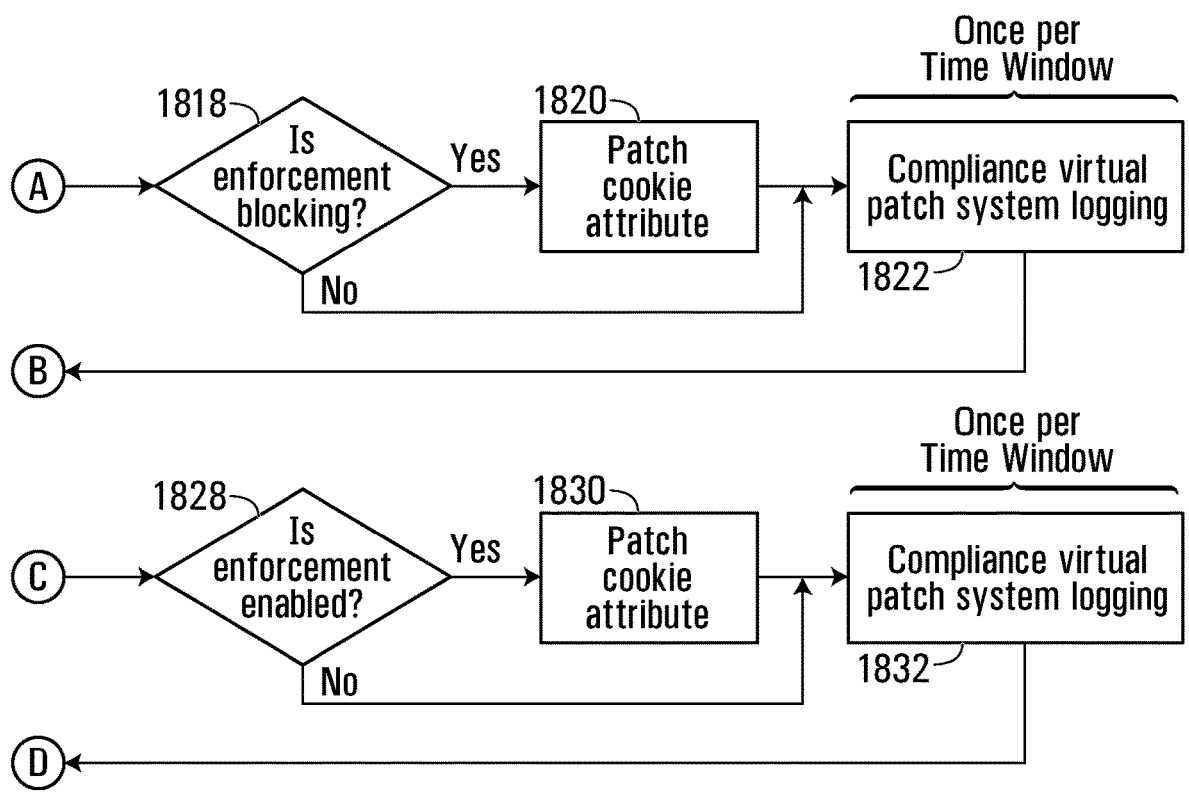

FIGS. 18A and 18B are diagrams of a security stack process 1800 for cookies according to some embodiments. The process 1800 starts at 1802 from a previous process for the firewall. At 1804, the process logic code determines whether a kill switch is enabled. If not, at 1808, the process logic code determines whether there are cookies. If there are cookies, at 1810, the process logic code determines whether there is an exception. If there is an exception, at 1812, the process logic code implements compliance exception system logging. If there is not an exception, at 1814, the process logic code determines whether there is SSL. If there is SSL, at 1816, the process logic code determines whether there is a secure flag. If there is a secure flag, at 1824, the process logic code implements a junction. At 1826, the process logic code determines whether there is HTTP only. If so, the process logic code implements a junction at 1834 and returns to 1808. If there is not a secure flag, at 1818, the process logic code determines whether there is enforcement blocking. If so, at 1820, the process logic code implements a patch cookie attribute. At 1822, the process logic code implements compliance virtual patch system logging. If there is not only HTTP, at 1828, the process logic code determines whether enforcement is enabled. If so, at 1830, the process logic code implements patch cookie attribute. At 1832, the process logic code implements compliance virtual system logging. At 1806, the process 1800 moves to the next process for the firewall.

Figure 19:
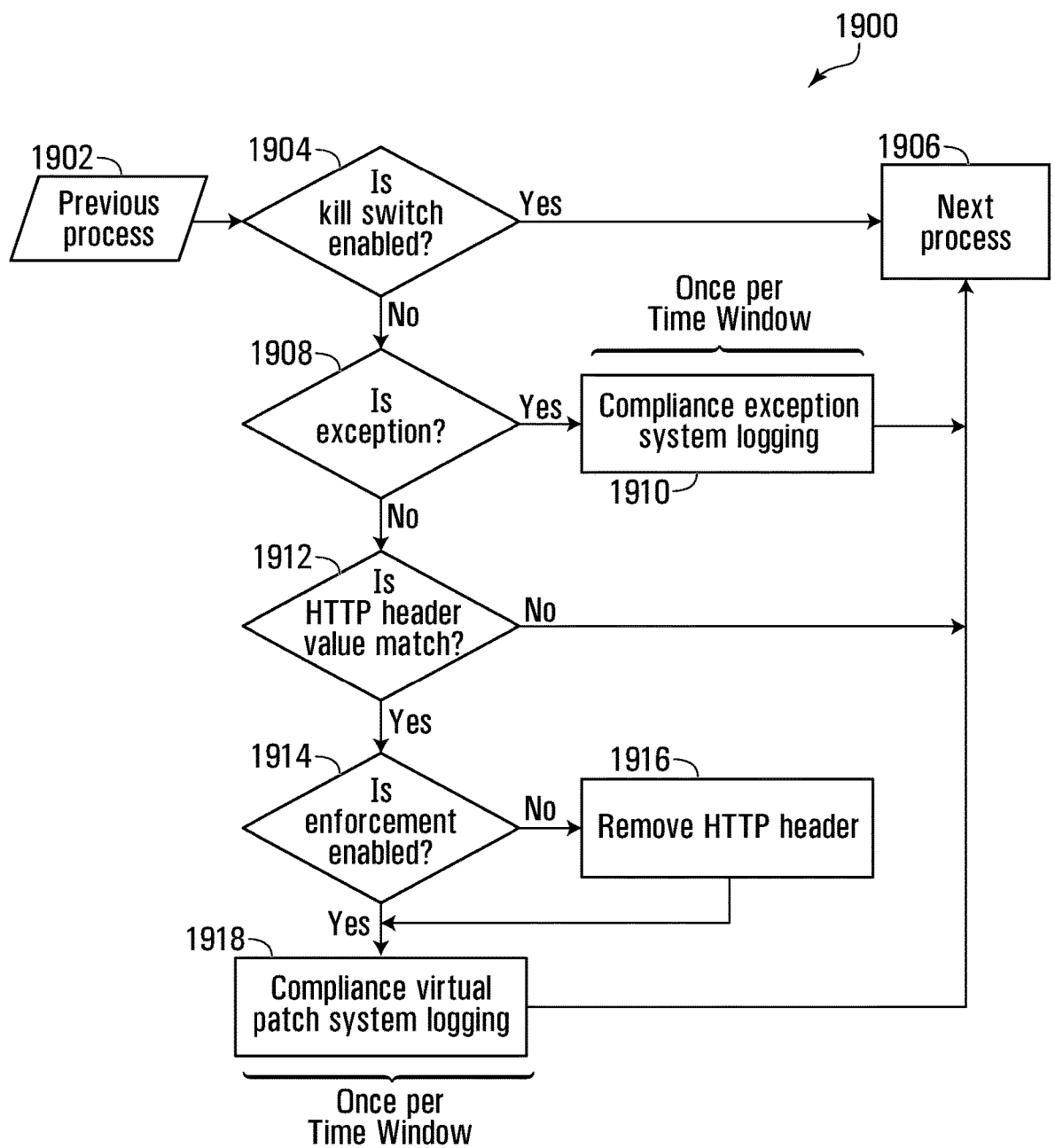
FIG. 19 is a diagram of a security stack process for CORS according to some embodiments.

FIG. 19 is a diagram of a security stack process 1900 for CORS according to some embodiments. The process 1900 starts at 1902 from a previous process for the firewall. At 1904, the process logic code determines whether there is a kill switch enabled. If not, at 1908, the process logic code determines whether there is an exception. If there is an exception, at 1910, the process logic code implements compliance exception system logging. If there is not an exception, at 1912, the process logic code determines whether there is an HTTP header value match. If so, at 1914, the process logic code determines whether enforcement is enabled. If so, at 1916, the process logic code removes the HTTP header. If not, at 1918, the process logic code implements compliance virtual patch system logging. At 1906, the process 1900 moves to the next process for the firewall.

Figure 20:
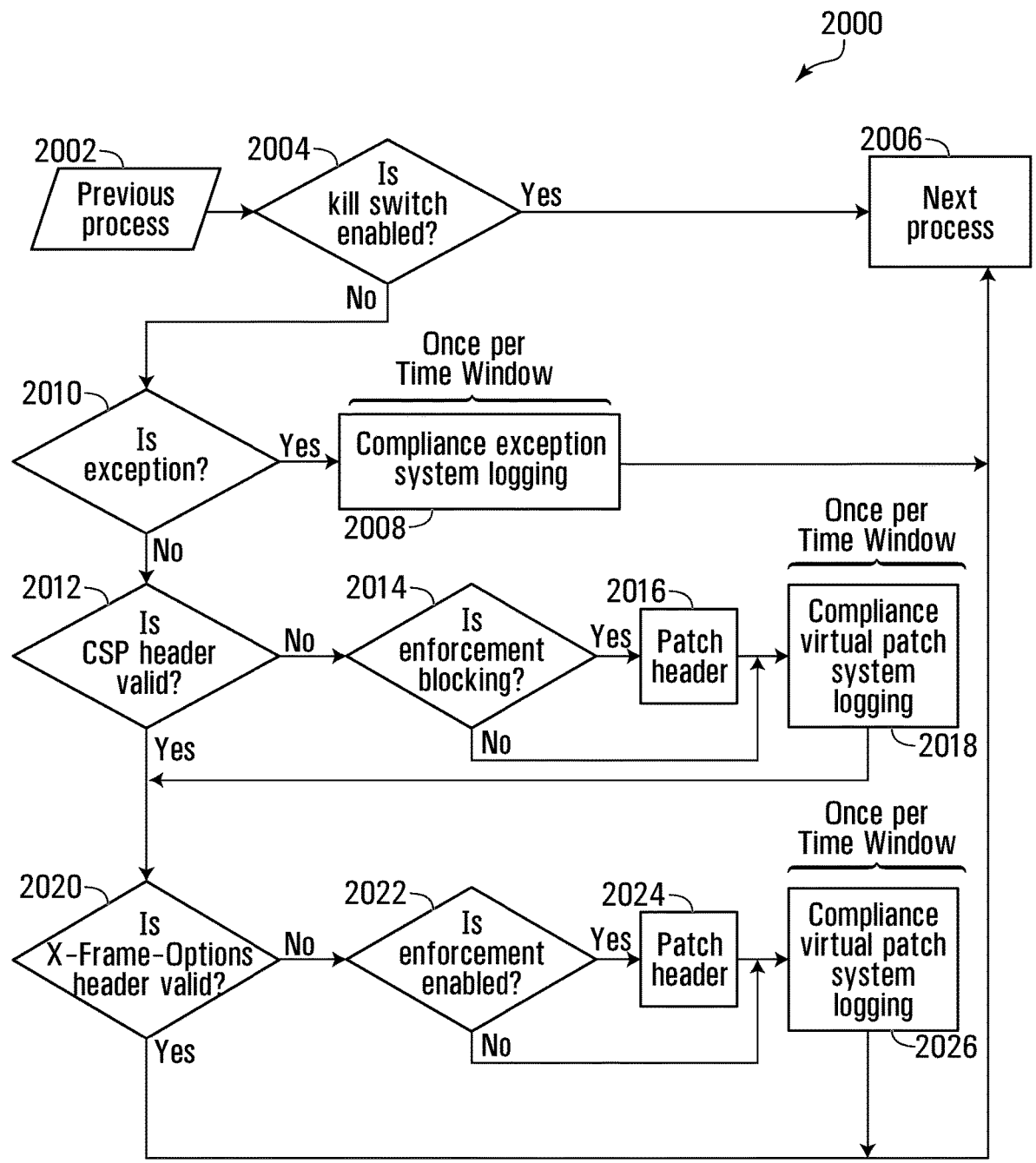
FIG. 20 is a diagram of a security stack process for clickjacking according to some embodiments.

FIG. 20 is a diagram of a security stack process 2000 for clickjacking according to some embodiments. The process 2000 starts at 2002 from a previous process for the firewall. At 2004, the process logic code determines whether there is a kill switch enabled. If not, at 2010, the process logic code determines whether there is an exception. If there is an exception, at 2008, the process logic code implements compliance exception system logging. If there is not an exception, at 2012, the process logic code determines whether there is a valid CSP header. If not, at 2014, the process logic code determines whether there is enforcement blocking and if so, at 2016, implements a patch header. If the CSP header is valid, at 2020, the process logic code determines whether frame options (e.g. X-frame options) are valid. If not, at 2022, the process logic code determines whether enforcement is enabled. If so, at 2024, the process logic code implements a patch header. At 2026, the process logic code implements compliance virtual patch system logging. At 2006, the process 2000 moves to the next process for the firewall.

Figure 21:
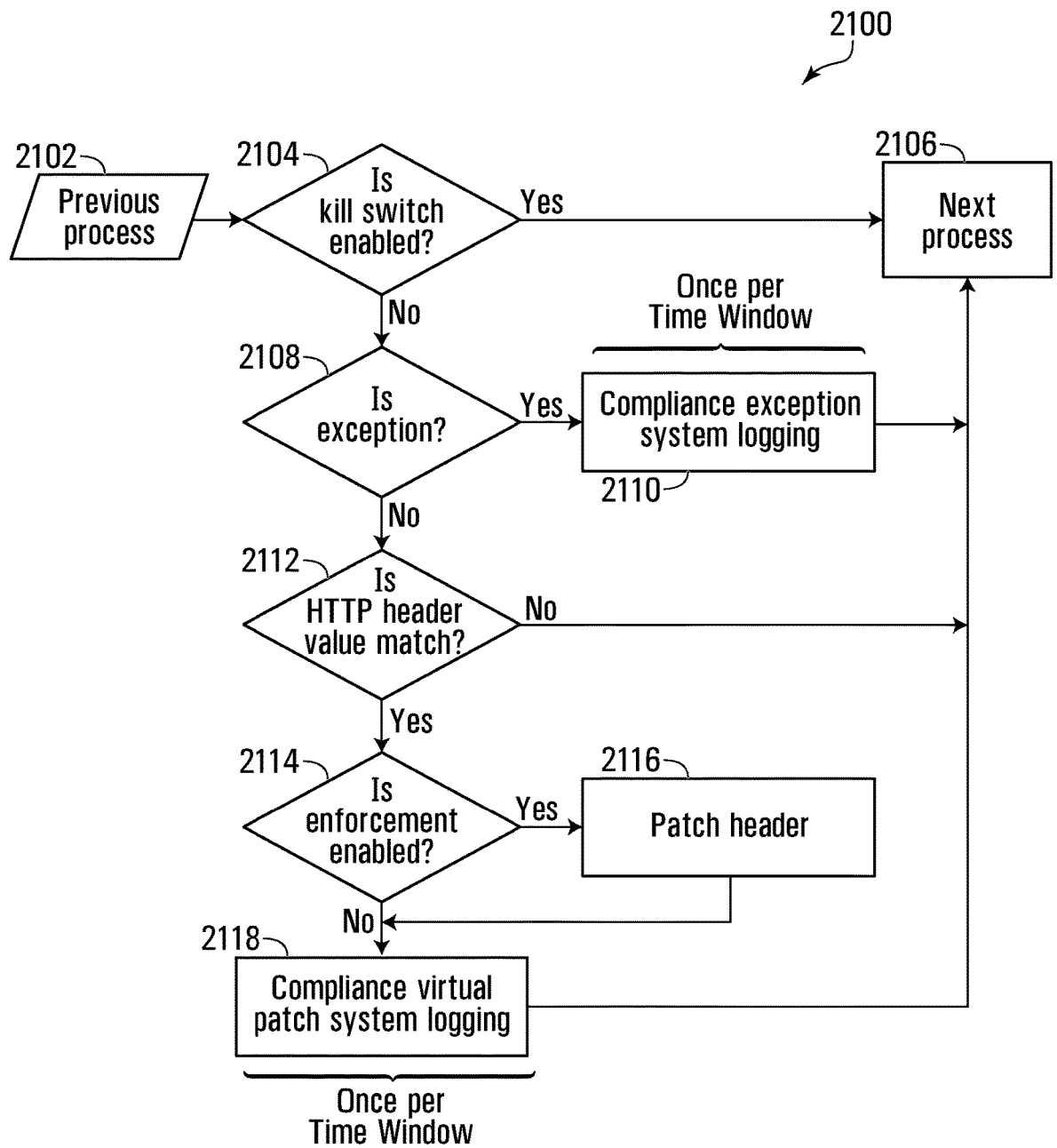
FIG. 21 is a diagram of a security stack process for cache control according to some embodiments.

FIG. 21 is a diagram of a security stack process 2100 for cache control according to some embodiments. The process 2100 starts at 2102 from a previous process for the firewall. At 2104, the process logic code determines whether there is a kill switch enabled. If not, at 2108, the process logic code determines whether there is an exception. If there is an exception, at 2110, the process logic code implements compliance exception system logging. If there is not an exception, at 2112, the process logic code determines whether there is an HTTP header value match. If so, at 2114, the process logic code determines whether enforcement is enabled. If so, at 2116, the process logic code implements a patch header. If not, at 2118, the process logic code implements compliance virtual patch system logging.

The firewall system 100 connects to other components in various ways including directly coupled and indirectly coupled via the network 108. Network 108 (or multiple networks) is capable of carrying data. Network 108 can involve wired connections, wireless connections, or a combination thereof. Network 108 may involve different network communication technologies, standards and protocols.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

Various example embodiments are described herein. Although each embodiment represents a single combination of inventive elements, all possible combinations of the disclosed elements include the inventive subject matter. Thus if one embodiment comprises elements A, B, and C, and a second embodiment comprises elements B and D, then the inventive subject matter is also considered to include other remaining combinations of A, B, C, or D, even if not explicitly disclosed.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. Computer or logic code can configure hardware elements, for example.

For simplicity only one firewall system 100 is shown but there may be additional firewall systems 100 operable by user devices 102 to access web applications 104 and exchange data. The firewall system 100 has at least one processor, a data storage device (including volatile memory or non-volatile memory or other data storage elements or a combination thereof), and at least one communication interface. The computing device components may be connected in various ways including directly coupled, indirectly coupled via a network, and distributed over a wide geographic area and connected via a network (which may be referred to as "cloud computing").

Figure 22:
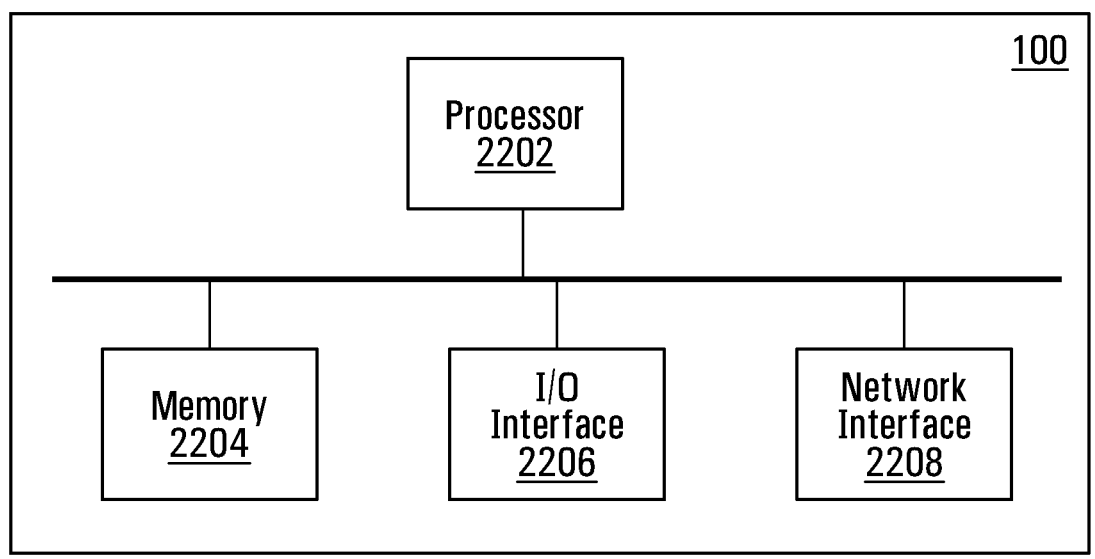
FIG. 22 is a diagram of a computing device for implementing aspects of the firewall system according to some embodiments.

FIG. 22 is a diagram of a computing device for implementing aspects of the firewall system according to some embodiments. The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Firewall system 100 includes at least one processor 2202, memory 2204, at least one I/O interface 2206, and at least one network interface 2208.

Each processor 2202 may be, for example, any type of general-purpose microprocessor or microcontroller, a digital signal processing (DSP) processor, an integrated circuit, a field programmable gate array (FPGA), a reconfigurable processor, or any combination thereof.

Memory 2204 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 2206 enables firewall system 100 to interconnect with one or more input devices, such as a keyboard, mouse, camera, touch screen and a microphone, or with one or more output devices such as a display screen and a speaker.

Each network interface 2208 enables firewall system 100 to communicate with other components, to exchange data with other components, to access and connect to network resources, to serve applications, and perform other computing applications by connecting to a network (or multiple networks) capable of carrying data.

Firewall system 100 is operable to register and authenticate users (using a login, unique identifier, and password for example) prior to providing access to applications, a local network, network resources, other networks and network security devices.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the embodiments described above and illustrated are intended to be examples.

What is claimed is:

1. A firewall system comprising a hardware processor executing code to configure widgets for web applications and a security stack, the security stack implementing an order of execution for the widgets and an activation configuration to toggle each widget to enable or disable security actions on a per web application basis, the widgets comprising security widgets and state control widgets, the security widgets having code to implement behaviour analysis detection and signature detection for a request received from a web application, and the state control widgets having code to implement decision making for network traffic.

2. The firewall system of claim 1, wherein the state control widgets comprise an initialization state control widget that provides a placeholder for security state logic to be executed as soon as the request is received and prior to any security detection by the security widgets.

3. The firewall system of claim 1, wherein the state control widgets comprise a post-inbound state control widget that provides a placeholder for security state logic to be executed after the request has been inspected for possible attack violation and before it is either sent to the web application or rejected all together.

4. The firewall system of claim 1, wherein the state control widgets comprise a post-outbound state control widget provides a placeholder for security state logic to be executed after the response has been inspected for possible attack violation and before virtual patching.

5. The system of claim 1, wherein a widget is a code segment that implements web application firewall (WAF) event listeners to provide particular firewall control functionality and interact with incoming or outgoing network traffic from the web applications.

6. The system of claim 1, wherein a widget that is disabled for a particular web application is bypassed by network traffic for the particular web application.

7. The system of claim 1, wherein the widgets includes a zero-tolerance widget such that any triggering of the zero-tolerance widget results in the widget performing a prescribed action.

8. The system of claim 1, wherein the widgets include a widget such that a prescribed action is only taken if a certain threshold of activity is surpassed over a given time.

9. The system of claim 1 wherein each widget has settings or switches, the switches including a kill switch to apply or ignore the widget.

10. The system of claim 1 wherein a security widget comprises code to implement security controls to process and inspect network traffic for a web application, the security controls for different types of detection in a given portion of data exchange with a web application.

11. The system of claim 1 wherein the security stack provides the order of execution for the widgets by assigning an execution priority value to each widget to define timing data for execution of the respective widget.

12. The system of claim 1, wherein the signature detection comprises custom signature detection and attack signature detection.

13. The system of claim 1 wherein the security widgets comprises code to implement virtual patch protection to remediate application security vulnerabilities through HyperText Transfer Protocol (HTTP) response modification.

14. The system of claim 1 wherein the behaviour analysis detection comprises code to implement behavioral analysis type of detection to blacklist addresses and perform pattern detection.

15. The system of claim 1 wherein the signature detection comprises code to implement custom signature type of detection to detect references to malicious domains and complex multi-staged signatures.

16. The system of claim 1 wherein the signature detection comprises code to implement attack signature type of detection to track and determine frequency of signature detection for cumulative tolerance attack sets.

17. The system of claim 1 wherein a widget implements at least one web application firewall (WAF) event listener to enable the widget to interact with inbound and outbound network traffic, wherein the WAF event listener declares a priority value for the security stack to determine the order of execution.

18. The system of claim 1 wherein a security widget implements a set of switches to allow granular flow control, the set of switches comprising at least one of a kill switch, enforcement switch and a block switch, the kill switch providing the ability to disable a security control at a policy level, the enforcement switch providing the ability to set a control in either detection or protection mode, the block switch providing the ability to force the control to reset a Transmission Control Protocol (TCP) connection instead of sending back a violation message through a HyperText Transfer Protocol (HTTP) response.

19. The system of claim 1 wherein a widget is an attack signature set to enable different types of tolerance for a particular activity relating to a web application, the different types of tolerance being zero tolerance and cumulative tolerance.

20. The system of claim 1 wherein the security widgets comprises a set of security widgets relating to inbound traffic flow and another set of security widgets relating to outbound traffic flow, wherein the set of security widgets relating to inbound traffic flow comprise an abusive session control, a domain control, and a signature control, wherein the set of security widgets relating to outbound traffic flow comprise a signature control and virtual patch protection.

21. The system of claim 1 wherein a security widget has one or more thresholds, the thresholds relating to volume thresholds or time thresholds.

22. A process for firewall system comprising:
at a processor,
receiving a request from a web application to process network traffic;
triggering an initialization state control widget;
processing the network traffic using security widgets having security logic to implement behaviour analysis detection, custom signature detection for the request, and attack signature detection based on the request for attack signatures;
triggering a post-inbound state control widget;
processing the network traffic using a set of security widgets having security logic to implement custom signature detection for a response, and standard attack signature detection for the response;
triggering a post-outbound state control widget;
implementing viral patch protection; and
triggering a finalization state control widget.

23. The process of claim 22, wherein the initialization state control widget provides a placeholder for security state logic to be executed as soon as the request is received and prior to any security detection by the security widgets.

24. The process of claim 22, wherein the post-inbound state control widget provides a placeholder for security state logic to be executed after the request has been inspected for possible attack violation and before it is either sent to the web application or rejected all together.

25. The process of claim 22, wherein the post-outbound state control widget provides a placeholder for security state logic to be executed after the response has been inspected for possible attack violation and before virtual patching.

* * * * *